United States Patent [19]

May et al.

[11] Patent Number: 5,323,229
[45] Date of Patent: Jun. 21, 1994

[54] MEASUREMENT SYSTEM USING OPTICAL COHERENCE SHIFTING INTERFEROMETRY

[75] Inventors: Bruce A. May, Poway; Thomas A. Lasko, Coronado; Dwight H. Everett, Encinitas, all of Calif.

[73] Assignee: Science Applications International Corporation, San Diego, Calif.

[21] Appl. No.: 938,281

[22] Filed: Aug. 31, 1992

[51] Int. Cl.$^5$ .................................................. G01B 9/02
[52] U.S. Cl. .................................... 356/357; 356/358; 356/345; 250/227.27
[58] Field of Search ............... 356/345, 355, 357, 358; 250/227.19, 227.27, 227.14

[56] References Cited

U.S. PATENT DOCUMENTS

| | | | |
|---|---|---|---|
| 3,824,018 | 7/1974 | Crane | 356/112 |
| 4,309,109 | 1/1982 | Blodgett et al. | 356/355 |
| 4,522,495 | 6/1985 | Shajenko | 356/345 |
| 4,595,292 | 1/1986 | Amodeo et al. | 356/346 |
| 4,596,466 | 6/1986 | Ulrich | 356/345 |
| 4,600,307 | 7/1986 | Krohn et al. | 356/346 |
| 4,606,639 | 8/1986 | Mottlier et al. | 356/358 |
| 4,627,731 | 12/1986 | Waters et al. | 356/349 |
| 4,634,282 | 1/1987 | Shaw et al. | 356/350 |
| 4,822,775 | 11/1989 | Coleman | 455/617 |
| 4,867,565 | 9/1989 | Lequime | 356/351 |
| 4,995,697 | 2/1991 | Adamovsky | 350/96.29 |
| 5,037,206 | 8/1991 | Etzkorn et al. | 356/358 |
| 5,058,973 | 10/1991 | Refregier et al. | 385/27 |
| 5,071,214 | 12/1991 | Jacob et al. | 385/12 |
| 5,073,024 | 12/1991 | Valette et al. | 356/345 |
| 5,076,699 | 12/1991 | Ryan et al. | 356/437 |
| 5,171,981 | 12/1992 | Wood | 250/227.14 |

Primary Examiner—Samuel A. Turner
Assistant Examiner—Robert Kim
Attorney, Agent, or Firm—Fitch, Even, Tabin & Flannery

[57] ABSTRACT

A coherence shifting interferometry system determines the thickness or refractive index of an optically transmissive medium. The system utilizes an optical energy source for generating a source beam. The source beam is divided into two beams by reflecting one portion of the beam off of a reflective surface, e.g., a front surface, of an optically transmissive test sample having the unknown thickness or refractive index. A second portion of the beam is transmitted through the sample and reflected off a refractive interface in the sample, e.g., a back surface. The two reflected beams are combined into a composite beam. The composite beam is then directed to a Mach-Zehnder type interferometer, where a portion of the combined beam traverses a fixed optical path length, and another portion traverses a variable optical path length. The variable optical path length is adjusted to realign portions of the two beams and cause interference, and the amount of adjustment provides a measure of the unknown thickness or refractive index.

13 Claims, 14 Drawing Sheets

MEASUREMENT SYSTEM USING OPTICAL COHERENCE SHIFTING INTERFEROMETRY

The present invention relates to the field of optical interferometry, and more, particularly to a system for determining: (1) the distance between two light reflective surfaces of a structure made of an optically transmissive material, and (2) the refractive index of an optically transmissive material.

BACKGROUND OF THE INVENTION

Optical interferometry is a measurement 10 technique that exploits the wave nature of light to produce extremely accurate measurements and provides excellent resolution without requiring any physical contact with the object being examined. Optical interferometry has been used to determine surface textures, shapes, distances, the speed of light through different media, and indices of refraction.

Optical interferometry is based on the phenomenon that two coherent light waves which are brought together (superimposed) behave similarly to water waves rippling through a pond. If the crest of one wave coincides with the crest of another wave, the waves reinforce one another in what is referred to as constructive interference. If the crest of one wave coincides with the trough of another wave, the waves cancel each other out. This canceling process is referred to as destructive interference. Several wave disturbances arriving at a point simultaneously result in a disturbance that is the vector sum of each of the separate disturbances.

The Michelson interferometer is a well known device that uses interferometry to make extremely precise measurements. One common embodiment of this device, shown in FIG. 1A includes a partially mirrored surface 200, which serves as a beam splitter, to divide a beam of monochromatic light into two beams 204 and 208 that are directed to travel in different directions. Monochromatic light is light having one color, and hence, one wavelength. One divided beam 204 reflects off a flat reference mirror 206 back to the beam splitter. The other divided beam 208 reflects off of a surface 210 being studied and returns back to the beam splitter where the two divided beams are recombined in an output beam 212. Recombining optical waves that are out of phase partially or totally cancel one another out. Optical waves that are in phase reinforce each other. The combined beams produce a pattern of alternating light and dark regions known as an interference pattern.

The difference in the lengths of the overall paths taken by each of the split beams is encoded in the interference pattern. For example, a difference between the distance traversed by the two beams equal to one wavelength (one-half wavelength up and back) results in the recombined wave going through one bright-dark-bright cycle. A dark region is created whenever the round-trip path along one arm, or beam path, of the interferometer increases or decreases by one-quarter wavelength with respect to the other arm since the total increased distance traveled by one of the split beams both up and back is one-half the wavelength (two times one-quarter wavelength) of the monochromatic beam.

Because the resolution of the Michelson interferometer is approximately one-half of the wavelength of the monochromatic light beam, optical interferometry provides very precise distance measurements.

Another type of interferometer is a Mach-Zehnder interferometer, shown in FIG. 1B. A Mach-Zehnder interferometer typically uses light 214 from a coherent light source that is split into two optical beams 216 and 218. The first split, or divided, beam can be used as a reference and traverses an optical path of fixed length. The other divided beam can be guided along an optical path having a variable length. The beams are subsequently recombined to produce an output beam 220 having an interference pattern. The length of the variable optical path length may be lengthened or shortened to achieve a desired relation between the two beams.

Optical interferometry has many practical applications. In the field of quality control, optical interferometry is used to measure distances and surface textures. Techniques for measuring surface texture using interferometry are described in Robinson, G.M., et al., "Optical Interferometry of Surfaces," *Scientific American,* pages 66–71, July 1991. The techniques described in that article are particularly suitable for measuring the surface textures of products such as photographic film, magnetic tape, and computer diskettes. Interferometric techniques that measure surface texture are also used to measure the degree of wear on products such as bearings.

Optical measurement techniques are well suited to physical dimension measurements in which accuracies on the order of microns are required. One common technique for optical measurements of physical dimensions is optical triangulation. Optical triangulation involves directing two laser beams from an electro-optic sensor unit towards a surface of interest, with the laser beams originating at points separated by several inches, and intersecting at the surface. As the distance between the sensor unit and surface of interest changes, the angle of one laser beam must be changed to keep the beam intersection point at the surface. The angle of this laser beam therefore provides an indication of the distance between the sensor head and surface of interest.

If two sensor heads are positioned on opposite sides of an object, the thickness of the object is determined by subtracting the distance readings of each sensor from the known separation between the two sensor heads. Thickness measurements by optical triangulation thus requires that a sensor be located on each side of an object under test. However, many structures having a thickness to be measured are formed on supporting structures, thus precluding access to one side of such structures. Therefore, optical triangulation is not suitable for applications lacking access to both sides of such structures.

Present optical triangulation systems can attain distance measurement accuracies of ±0.0001 inches (±2.5 microns). When two such devices are used to determine thickness, the accuracy limits of each sensor combine to yield a total thickness accuracy limit of ±0.00014 inches (±3.5 microns). However, there are plastic product manufacturing applications where greater thickness accuracies, up to ±.00003 (±1 μm), are required.

There are many other applications where it is necessary to measure the thickness of optically transmissive (transparent and translucent) media, associated with, for example, lenses, video tape, audio tape, photographic films, coatings, compact disks, laminated structures, and supported structures. However, optical triangulation methods cannot measure the thicknesses of transparent or translucent objects because the sensor requires a visible illuminated spot, from diffuse reflection of the irradiating beams, on the surface of interest. This spot is measured by an optical sensor and as the surface distance changes, the beam angle of one of the beams is changed to maintain a single spot. However, transparent or translucent surfaces do not reflect enough light to provide a detectable spot.

Therefore, there is a need for a system capable of measuring the thickness of optically transparent or translucent media. A further need exists for a thickness measurement system that can be used when only one side of the object having the thickness to be measured is accessible. Still a further need exists for a thickness measurement system and method that can determine thicknesses of optically transmissive media with accuracies greater than ±0.00014 inches (±3.5 microns).

SUMMARY OF THE INVENTION

The present invention utilizes coherence shifting interferometry to provide a system for determining an unknown thickness or refractive index of an optically transmissive medium which may be transparent or translucent. In general, the system involves dividing a source beam of light into two beams by reflecting one portion of the beam off of a reflective surface of an optically transmissive test sample having an unknown thickness or refractive index. A second portion of the beam is transmitted through the sample and reflected off a refractive interface in the sample, e.g., a back surface. A refractive interface or surface is a refractive index boundary of two conterminous media having different refractive indices which causes optical signals to refract if they pass through the interface and to reflect off the interface if they do not pass through it. The different path lengths traversed by the two beams causes a phase lag, or phase shift between them. The phase shift is equal to twice the thickness of the test sample since the second portion of the beam must travel back and forth through the sample. The reflected beams are recombined into a composite beam. The composite beam is then input to a Mach-Zehnder type interferometer which divides the composite beam into two portions. One portion of the composite beam traverses an optical path of fixed length in the interferometer. The other portion of the composite beam is guided along an optical path of variable length in the interferometer. The length of the variable length optical path is changed so that the shift between the reflected beams that comprise the composite beam is eliminated, i.e., the beams are "realigned" so that their path length difference is comparable to, or less than, the coherence length of the optical energy source. The change in the optical path length necessary to realign the beams is then used to determine the thickness or refractive index of the test sample structure.

Thickness Measurement with Reference Sample

One embodiment of the present invention may be characterized as a system for determining the unknown thickness of an optically transparent test sample. Such system includes: (1) an optical energy source for generating an optical source beam; (2) first means coupled to receive the source beam for: (a) directing a first portion of the source beam to irradiate an optically transmissive test sample having an unknown thickness such that the first portion of the source beam is divided into a first reflected beam that reflects off a front surface of the test sample, and into a second reflected beam that reflects off a refractive interface, e.g., a back surface, of the test sample, where the test sample has an index of refraction, n, (b) receiving and combining the first and second reflected beams into a first composite beam, (c) directing a second portion of the source beam to irradiate an optically transmissive reference sample having a known thickness such that the second portion of the source beam is divided into a third reflected beam that reflects off a front surface of the reference sample, and into a fourth reflected beam that reflects off a refractive interface, e.g., a back surface, of the reference sample, the reference sample having the same index of refraction, n, (d) receiving and combining the third and fourth reflected beams into a second composite beam, and (e) combining the first and second composite beams into a third composite beam; (3) an optical Mach-Zehnder type interferometer having a fixed optical path length coupled to receive a first portion of the third composite beam from the first means and a variable optical path length coupled to receive a second portion of the third composite beam from the first means; (4) an optical path length modulator coupled to the variable optical path length of the interferometer for changing the length of the variable optical path length to provide optical interference between the first and second portions of the third composite beam; and (5) an optical detector coupled to receive the interfering first and second portions of the third composite beam from the optical interferometer for generating electrical signals representative of the third composite beam interference. The unknown distance may then be determined from the electrical signals using a data processor, a display, such as an oscilloscope, or equivalent.

Thickness Measurement with no Reference

Another embodiment of the invention also provides a system for determining an unknown thickness of an optically transmissive material, but does not employ a reference sample. Such system may be characterized as including: (1) an optical energy source for generating an optical source beam; (2) first means coupled to receive the source beam for: (a) directing a first portion of the source beam to irradiate an optically transmissive test sample having an unknown thickness between a front surface and a refractive interface (e.g., a back surface) such that the first portion of the source beam is divided into a first reflected beam that reflects off the front surface of the test sample, and into a second reflected beam that reflects off a refractive surface, e.g., a back surface, of the test sample, where the test sample has a known index of refraction, and (b) receiving and combining the first and second reflected beams into a first composite beam; (3) an optical Mach-Zehnder type interferometer having a fixed optical path length coupled to receive a first portion of the first composite beam from the first means, and a variable optical path length coupled to receive a second portion of the first composite beam from the first means; (4) an optical path length modulator coupled to the variable optical path length of the interferometer for changing the length of the variable optical path length at a known rate to provide optical interference between the first and second portions of the first composite beam; and (5) an optical detector coupled to receive the interfering first and second portions of the first composite beam from the optical interferometer for generating electrical signals representative of the first composite beam interference.

The unknown distance may then be determined from such electrical signals.

Refractive Index Measurement with Reference

A still further embodiment of the present invention may be characterized as a system to determine an unknown index of refraction of an optically transmissive test medium. Such system includes: (1) an optical energy source for generating an optical source beam; (2) first means coupled to receive the source beam for: (a) directing a first portion of the source beam to irradiate an optically transmissive test sample having a known thickness between a front surface and a refractive surface (e.g., a back surface) such that the first portion of the source beam is divided into a first reflected beam that reflects off the front surface of the test sample, and into a second reflected beam that reflects off a refractive surface e.g., the back surface, of the test sample, where the front and refractive surfaces are separated by a known distance, the test sample having an unknown index of refraction, (b) receiving and combining the first and second reflected beams into a first composite beam, (c) directing a second portion of the source beam to irradiate an optically transmissive reference sample having a known thickness between its front surface and its back surface such that the second portion of the source beam is divided into a third reflected beam that reflects off the front surface of the reference sample and into a fourth reflected beam that reflects off the back surface of the reference sample, where the front and back surfaces of the reference sample are separated by the known distance, the reference sample having a known index of refraction, (d) receiving and combining the third and fourth reflected beams into a second composite beam, and (e) combining the first and second composite beams into a third composite beam; (3) an optical Mach-Zehnder type interferometer having a fixed optical path length coupled to receive a first portion of the third composite beam from the first means and a variable optical path length coupled to receive a second portion of the third composite beam from the first means; (4) an optical path length modulator coupled to the variable optical path length of the interferometer for changing the length of the variable optical path length to provide optical interference between the first and second portions of the third composite beam; and (5) an optical detector coupled to receive the interfering first and second portions of the third composite beam from the optical interferometer for generating electrical signals representative of the third composite beam interference. The unknown index of refraction may then be determined from the electrical signals using a suitable data processor or a display device.

Refractive Index Measurement with no Reference

Yet another embodiment of the present invention may be characterized as a system for determining an unknown index of refraction of an optically transmissive test sample, but which does not require the use of a reference sample having a known index of refraction. Such system includes: (1) an optical energy source for generating an optical source beam; (2) first means coupled to receive the source beam for: (a) directing a first portion of the source beam to irradiate an optically transmissive test sample having a known thickness between a front surface and a refractive interface (e.g., a back surface) such that the first portion of the source beam is divided into a first reflected beam that reflects off the front surface of the test sample and into a second reflected beam that reflects off the refractive surface, e.g., the back surface, of the test sample, where the front and back surfaces of the test sample are separated by the known distance, and where the test sample has an unknown index of refraction, and (b) receiving and combining the first and second reflected beams into a first composite beam; (3) an optical Mach-Zehnder type interferometer having a fixed optical path length coupled to receive a first portion of the first composite beam from the first means and a variable optical path length coupled to receive a second portion of the first composite beam from the first means; (4) an optical path length modulator coupled to the variable optical path length of the interferometer for changing the length of the variable optical path length at a known rate to provide optical interference between the first and second portions of the first composite beam; and (5) an optical detector coupled to receive the interfering first and second portions of the first composite beam from the optical interferometer for generating electrical signals representative of the first composite beam interference. The unknown index of refraction may then be determined from the electrical signals using a suitable data processor and/or display device.

Advantages of the System

An advantage of the system embodying various features of the present invention is to provide real-time measurement of the thickness of optically transmissive material using a non-contact technique.

Another advantage of the system of the present invention is that it allows the determination of the thickness of an optically transmissive material which may be located in explosive, volatile, and/or sensitive environments where the use of electricity would be unsafe and/or impractical.

An additional advantage of the present invention is that it provides a system capable of measuring the thickness of optically transparent or translucent media.

A further advantage of the present invention is that it provides a system that can determine the thickness of an object when the object is accessible from only one side of the object.

Yet another advantage of the present invention is that it provides a system and method for determining the thickness of an optically transmissive material with accuracies greater than ±0.0001 inches (±2.5 microns).

Still an additional advantage of the invention is that it may also be employed to determine an unknown index of refraction of an optically transmissive material,

BRIEF DESCRIPTION OF THE DRAWING

The above and other aspects, features, and advantages of the present invention will become more apparent from the following, more detailed description presented in conjunction with the following drawings wherein.

Throughout the specification and various views of the drawings, like components are referred to with like reference numerals.

DESCRIPTION OF THE PREFERRED EMBODIMENTS

The following description is of the best mode presently contemplated for carrying out the invention. This description is not to be taken in a limiting sense, but is made for the purpose of describing the general principles of the invention. The scope of the invention should be determined with reference to the claims.

The system of the present invention employs coherence shifting optical interferometry to determine the thickness of transparent or translucent structures with very high accuracy and precision. For example, one embodiment of the invention has been demonstrated to measure thicknesses of up to 0.040 inches (1.0 mm) with an accuracy of ±0.0001 inches (±2.5 microns). However, it is to be understood that the scope of the invention is not to be limited to such performance. Other embodiments of the invention may be employed to determine unknown thicknesses of optically transparent structures or films, with greater or lesser accuracy and precision, depending on the requirements of a particular application. Advantageously, thickness determinations may be made in real-time to monitor the quality of such structures as they are being manufactured.

Coherence and Interference

Figure 1A:
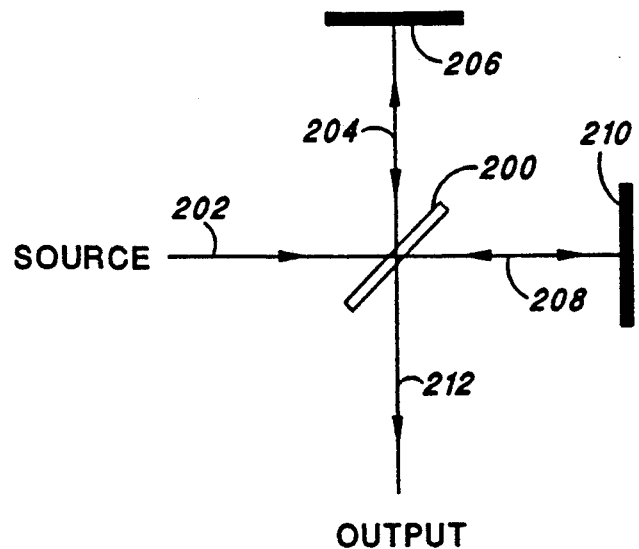
FIGS. 1A and 1B schematically illustrate prior art Michelson and Mach-Zehnder interferometers, respectively, and were described above.
Figure 1B:
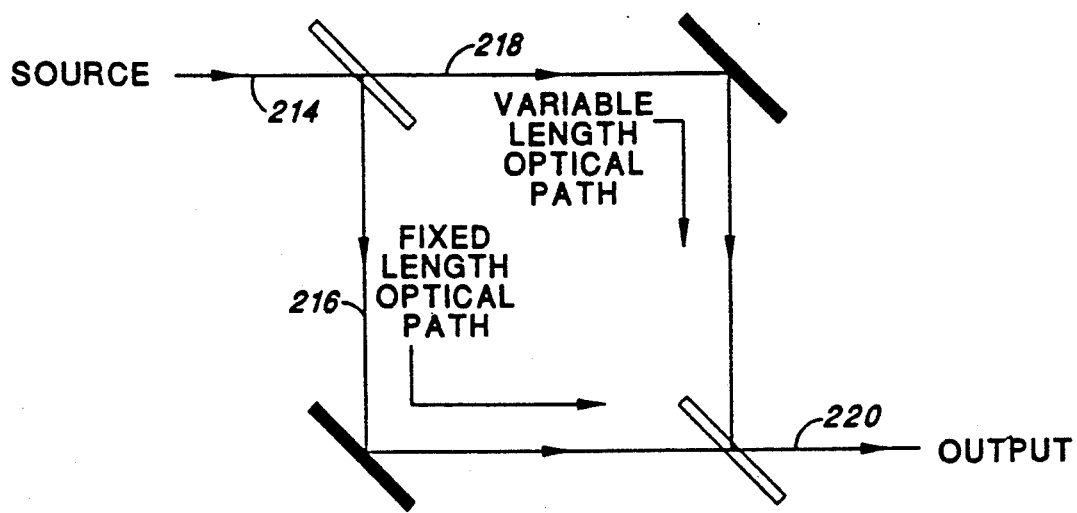
Figure 2A:
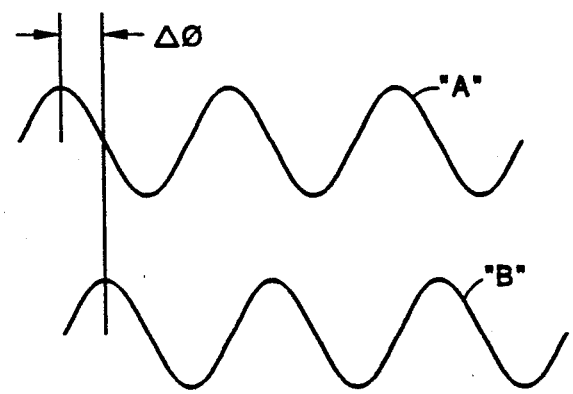
FIG. 2A shows two coherent waves separated by a phase difference, $\Delta\phi$.
Figure 2B:
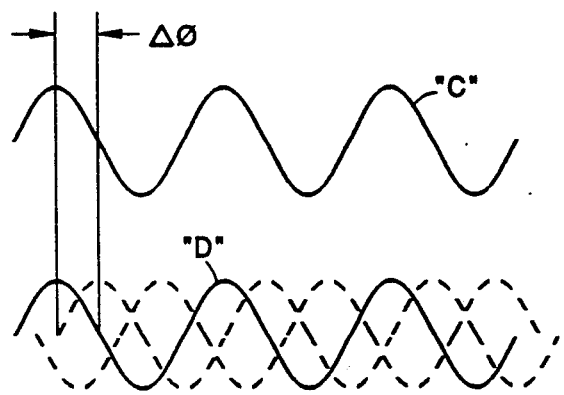
FIG. 2B shows two incoherent waves.

Optical coherence denotes the degree to which two light waves are stably related in phase. Optical energy is said to be coherent if there are definite phase relationships between the optical energy at different positions in an arbitrary cross-section of an optical beam. The phase relationship of non-coherent optical energy is random. FIG. 2A depicts coherent waves "A" and "B" which are offset by a constant phase difference, $\Delta\phi$. If these waves are combined, they will interfere and yield a resultant optical intensity, I, which depends on the phase difference according to:

$$I = 4I_o \cos^2(\Delta\phi),$$

where $I_o$ represents the intensity of each light wave. FIG. 2B depicts incoherent waves "C" and "D". The phase difference, $\Delta\phi$, between the "C" and "D" waves is completely random. Combining incoherent waves yields a constant intensity, I, equal to the average intensity of all possible phase differences, $\Delta\phi$, where $I = 2I_o$.

Degrees of coherence are quantified by a parameter called coherence length. Coherence length is the spatial extent over which a light beam is coherent, and is generally dependent on the source of the light. For example, light emitting diodes ("LED") have coherence lengths in the range of 20–100 $\mu$m. For an LED with a 40 $\mu$m coherence length, the phase difference between one point and another along the length of the output beam within a distance of 40 $\mu$m is stable. However, the relative phase relationships of the beam between two points separated by, for example, 80 $\mu$m are random. Thus, light waves generated by an LED having a 40 $\mu$m coherence length and separated by much more than 40 $\mu$m are emitted at slightly different times, and over that duration, the relative phase relation of the emitted light waves is not maintained.

If the path length difference between two separate optical beams or signals generated by the same optical energy source is comparable to or less than the coherence length of the optical energy source, combining the signals produces a measurable fringe, or interference, pattern. Any process which results in the shifting and recombining of two separate beams or signals generated by the same optical energy source, wherein the amount of shift is greater than the source coherence length, does not produce interference. However, any subsequent splitting, shifting, and recombining of the two signals which realigns the original beams within the coherence length, or less, of the optical energy source produces measurable interference. Realignment is the process whereby the phase angle between two optical beams is changed so that the beams interfere with one another.

Coherence shifting interferometry as applied in the system of the present invention involves dividing a source beam of light into two beams by reflecting one portion of the beam off of a reflective surface of an optically transmissive test sample having an unknown thickness or refractive index. A second portion of the beam is transmitted through the sample and reflected off a refractive interface in the sample, e.g., a back surface. A refractive interface is a refractive index boundary of two conterminous media having different refractive indices which causes optical signals to refract if they pass through the interface and to reflect off the interface if they do not pass through it. The different path lengths traversed by the two beams causes a phase lag, or phase shift between them. The phase shift is equal to twice the thickness between the front surface and refractive interface (e.g., back surface) of the test sample since the second portion of the beam must travel back and forth through the sample. The reflected beams are recombined into a composite beam. The composite beam is then input to a Mach-Zehnder type interferometer which divides the composite beam into two portions. One portion of the composite beam traverses an optical path of fixed length in the interferometer. The other portion of the composite beam is guided along an optical path of variable length in the interferometer. The length of the variable length optical path is changed so that the shift between the reflected beams that comprise the composite beam is eliminated, i.e., the beams are "realigned" so that their path length difference is comparable to, or less than, the coherence length of the optical energy source. The change in the optical path length necessary to realign the beams is then used to determine the thickness or refractive index of the test sample structure.

The optical path length of a medium is equal to cd/v, where "c" is the speed of light in a vacuum, "d" is the distance a light signal travels through a medium, such as glass or quartz, and "v" is the speed of light in the medium. The optical path length may also be expressed as nd, where "n" is the index of refraction of the medium. The speed of light in a vacuum is $3 \times 10^8$ m/s, where it is a maximum. Because light travels faster in a vacuum than it does through any other medium, such as glass, the optical path length of light traveling through a piece of glass one meter in length is greater than the optical path length of light traveling a distance of one meter in a vacuum. For example, the index of refraction of crown glass is 1.52. Then, from Snell's Law, the speed of light through glass is given by: c/n, where "c" is the speed of light in a vacuum and "n" is the index of refraction of glass. For crown glass this speed, given by, c/n, is equal to $2 \times 10^8$ m/s. The time required for light to pass through 1.0 meter of crown glass is 1 m/$1.97 \times 10^8$ m/s, or $5.1 \times 10^{-9}$ seconds During this same time interval, light traveling in a vacuum would traverse a distance of $3 \times 10^8$ m/sec $\times 5.1 \times 10^{-9}$ sec, or 1.52 m. Thus, it can be seen that the optical path length through a specific thickness of glass, or any other optically transmissive medium, is equal to the product "nd."

Coherence Shifting Interferometer System

Figure 3A:
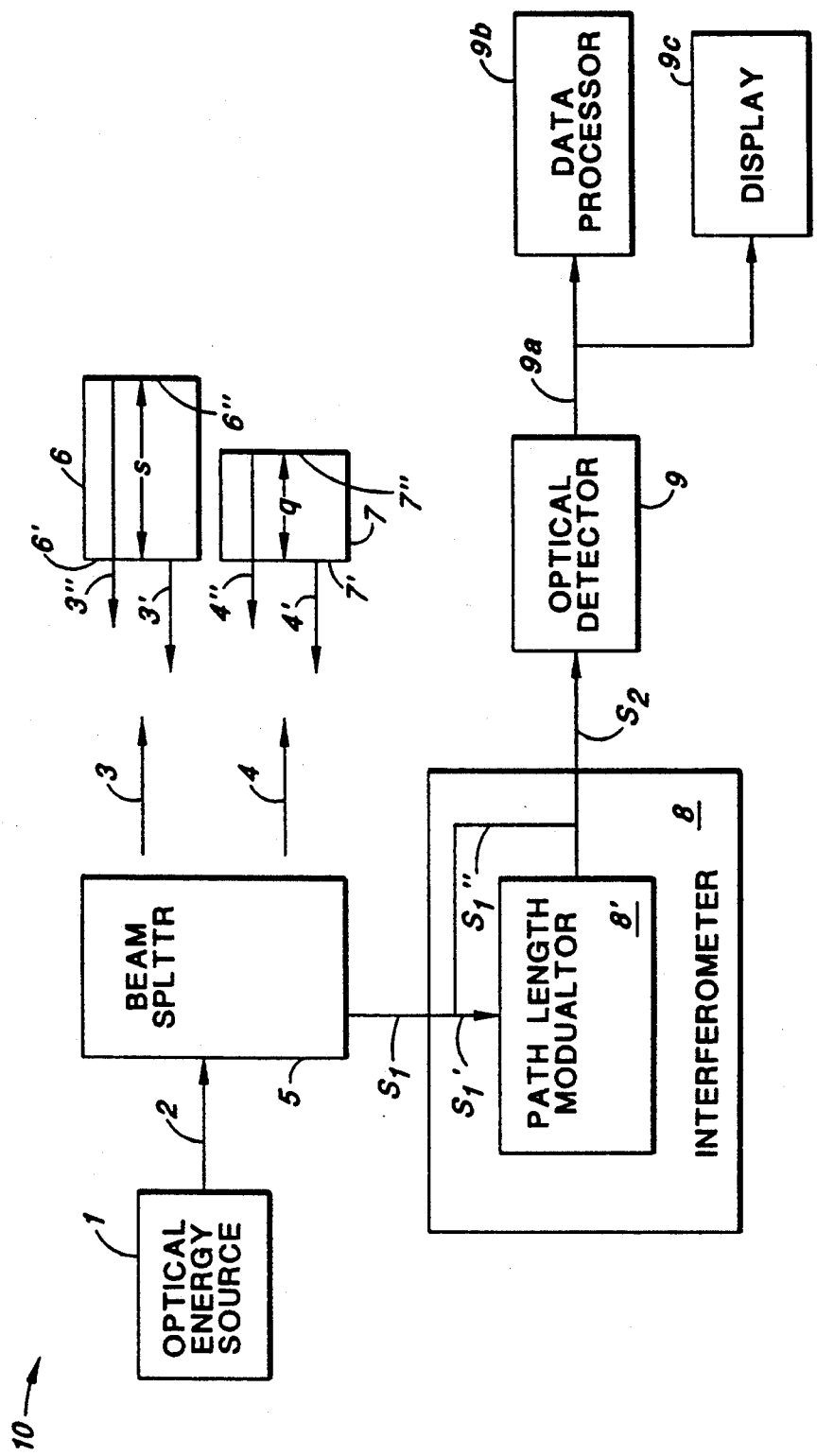
FIG. 3A is a functional block diagram of a system embodying various features of the present invention which employs an optical interferometer to determine an unknown thickness or refractive index of an optically transmissive medium.

FIG. 3A presents a block diagram of a system 10 embodying various features of the present invention for determining an unknown thickness or index of refraction of an optically transmissive test sample 6 which employs coherence shifting interferometry. FIG. 3A shows an optical energy source 1 generating an optical signal 2 which is split into two signals 3 and 4 by a beam splitter 5, such as a partially reflective mirror, prism, or optical coupler. The signal 3 is directed to the test sample 6 having an unknown thickness, s, which is to be determined. One portion of the signal 3 reflects off the front surface 6' of the test sample as a signal 3'. The remaining portion of the signal 3 propagates through the test sample 6 and reflects off a refractive interface 6", i.e., the back surface, in the test sample as a signal 3". The propagation of the signal through the test sample 6 causes a path length shift of the signal 3" with respect to the signal 3' by an amount proportional to the unknown thickness of the sample. The signals 3' and 3" are both reflected from the test sample 6 back to the beam splitter 5.

Figure 13:
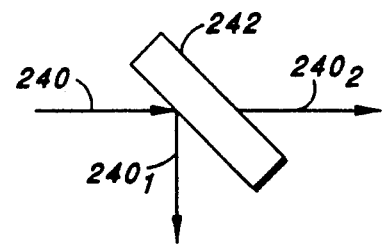
FIG. 13 shows a partially reflective mirror used as a beam splitter.

Three types of devices, or beam splitters, are commonly used for optical beam splitting and may be employed in the system 10. These same types of devices may also be used to combine optical beams. One type of beam splitter is a partially reflective mirror 242, as shown in FIG. 13. Referring to FIG. 13, a light beam 240 incident from the left strikes the partial mirror 242. Half of the light beam 240 reflects off of the mirror 242 in a downward direction as light beam $240_1$. The remainder of the light beam 240 travels through the partial mirror 242 and exits the mirror as a light beam $240_2$ in the same direction as the incident light beam 240.

Figure 14:
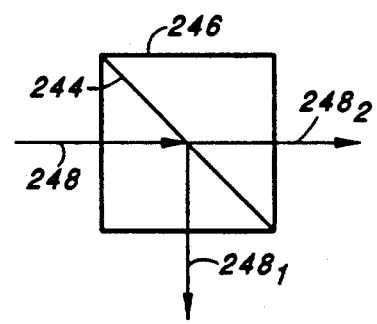
FIG. 14 shows a prism used as a beam splitter.

FIG. 14 depicts a prism type beam splitter 246. Referring to FIG. 14, a partially reflective film 244 is deposited on a surface which runs diagonally through the cube prism 246. An incident light beam 248 enters the prism 246. A portion of the light beam 248 reflects off of the partially reflective film 244 as light beam $248_1$. The remainder of the light beam 248 which is not reflected propagates through the prism 246 as a light beam $248_2$ and travels out of the prism in the same direction as the light beam 248.

Figure 15:
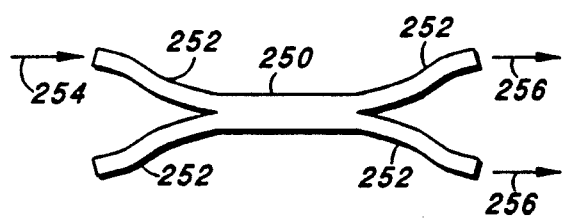
FIG. 15 shows an optical coupler type of beam splitter.

A third type of optical beam splitter is a fused biconic taper fiber optic (optical) coupler 250, commonly used to split optical beams travelling in optical fibers. Such an optic coupler 250, shown in FIG. 15, is a well known device having three or more optical fibers, or ports, 252 interconnected to provide mutual coupling between them. One function of an optic coupler is to equally split an optical signal 254 into two or more optical signals 256. Another function of an optic coupler is to combine two or more optical signals into fewer optical signals. By way of example, optic coupler 250 is shown to be a $2 \times 2$ optic coupler. Coupler 250 may be used to divide one light beam into two light beams, or to combine two separate light beams into one combined light beam.

Referring again to FIG. 3A, the signal 4 is directed to a reference sample 7 having a known thickness, q. One portion of the signal 4 reflects off a front surface 7' of the reference sample as a signal 4'. The remaining portion of the signal 4 propagates through the reference sample 7 and reflects off a refractive interface 7", i.e., a back surface, of the reference sample 7 as a signal 4". The propagation of signal 4" through the reference sample results in a path length shift of the signal 4" with respect to the signal 4' by an amount proportional to the known thickness of the reference sample. The signals 4' and 4" reflect from the test sample 7 back to the beam splitter 5. The beam splitter 5 combines the signals 3', 3", 4', and 4" into a composite signal $S_1$.

The composite signal $S_1$ propagates to a Mach-Zehnder type of optical interferometer 8 where it is divided into the signals $S_1'$ and $S_1''$. The signal $S_1'$ propagates through an optical path length modulator 8' which varies the optical path length traversed by the composite signal $S_1'$ to realign portions of the shifted signals 3' and 3" and 4' and 4" that all comprise the signals $S_1'$ and $S_1''$. The signals $S_1'$ and $S_1''$ are recombined into a signal $S_2$ in the interferometer. When the optical path length difference between the paths traversed by signals $S_1'$ and $S_1''$ is equal to the path length shift between signals 3' and 3'', within the optical energy source coherence length, then the signals 3' and 3'' interfere. Similarly, when the optical path length difference between the paths traversed by $S_1'$ and $S_1''$ is equal to the path length shift between signals 4' and 4'', within the optical energy source coherence length, then the signals 4' and 4'' interfere. An optical detector 9 transforms the signal $S_2$ from the optical interferometer 8 into analogous electrical signals 9a. A data processor 9b and/or display 9c (such as an oscilloscope), may receive the electrical signals 9a from the optical detector 9. The data processor may be employed to determine the thickness of the test sample 6 by analyzing the waveform of the electrical signals 9a. Similarly, the display 9c may exhibit a representation of the thickness or refractive index of the sample 6.

Functional Description of a First Embodiment

Figure 3B:
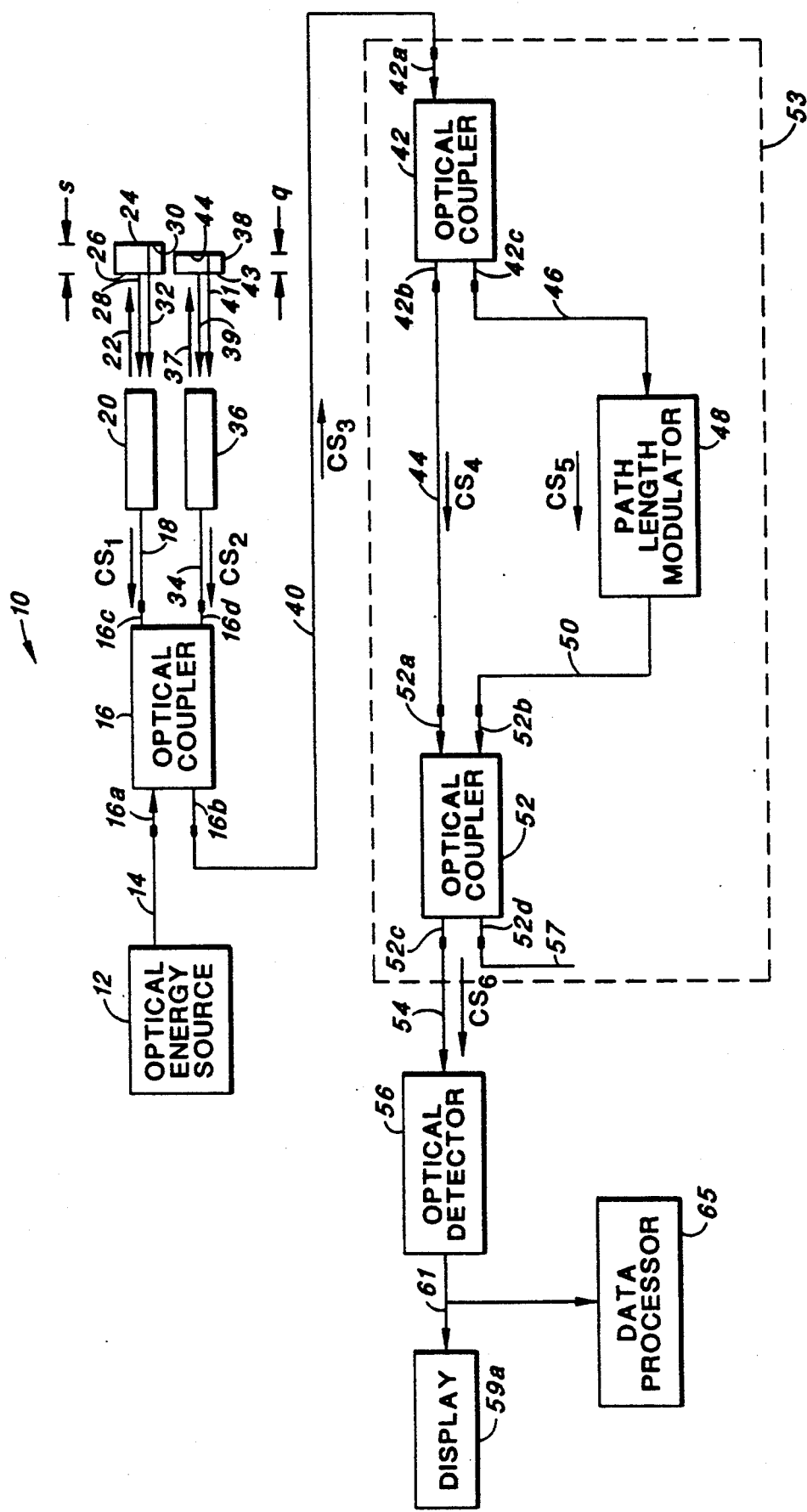
FIG. 3B is a functional block diagram of one example of the system of FIG. 3A.

Referring now to FIG. 3B, there is shown a functional block diagram of a first embodiment of system 10. The system 10 includes an optical source 12 which may be any optical energy or light emitting device which generates an optical output signal characterized by a coherence length comparable to the minimum distance resolution necessary to suit the requirements of a particular application. The optical energy output from optical energy source 12 is coupled through optical fiber 14 and port 16a of an optical coupler 16. The optical coupler 16 is preferably a 2×2 coupler having ports 16a, 16b, 16c, and 16d.

The optical coupler 16 divides the signal 14 into two signals. One of the divided signals propagates through both the port 16c and optical fiber 18 to a collimating lens 20, from which it is emitted as an optical signal 22. A collimating lens directs all light rays emanating from a source, such as the optical fiber 18, to propagate along parallel paths. The other signal divided from the signal 14 by the beam splitter 16 propagates through both the port 16d and optical fiber 34 to a collimating lens 36, and is emitted as an optical signal 37. In each of the embodiments of the present invention, all of the optical couplers and optical fibers are preferably single mode devices.

Hereinafter, it is noted that the signal appearing or present on a given signal line may be referenced using the same reference number as the signal line. For example, the output of the optical energy source 12 as it propagates through the optical fiber 14 may be referred to as the "signal 14."

Still referring to FIG. 3B, the optical signal 22 emitted from the collimating lens 20 interacts with a test sample 24 so as to be divided into two optical signals. One of the signals divided from signal 22 reflects off of the first (front) incident reflective surface 26 of the test sample 24 to provide a reflected signal 28. The other signal divided from signal 22 is the signal 32. The signal 32 represents that portion of the signal 22 that is transmitted through the unknown thickness of the test sample 24 and reflects off of a refractive interface 30 (e.g., back surface) of the test sample. The signals 28 and 32 are each reflected back into the collimating lens 20 where they are combined into a composite signal $CS_1$. However, the optical path length which the signal 32 travels to reach the lens 20 is greater than the optical path length which the signal 28 traverses to reach the lens 20 by the factor of 2ns, where s is the unknown thickness of the test sample 24 and n is the index of refraction of the test sample. The coefficient "2" in the factor 2ns results from the signal 32 traversing the thickness of the test sample 24 twice. If the factor 2ns is significantly greater than the coherence length of the optical energy source 12, the signals 28 and 32 lose their coherent relationship with respect to each other and do not immediately interfere.

The optical signal 37 emitted from collimating lens 36 interacts with an optically transmissive reference sample 38 so as to be divided into a reflected signal 39 which reflects off of the first reflective surface 43 of the reference sample 38, and into a reflected signal 41 which divides from the signal 37 and is transmitted through the reference sample 38 to reflect off of a refractive interface 44 of the reference sample 38. The reference sample 38 has a known thickness q between the surface 43 and refractive interface 44. The reflected signals 37 and 39 are received by the collimating lens 36 where they are combined into a composite signal $CS_2$.

The reference 38 is preferably composed of the same material as the test sample 24 so that they have identical indices of refraction. The reference 38 is employed to eliminate the refractive index of the test sample as a variable in the determination of the thickness of the test sample 24. Advantageously, this feature allows the precise measurement of the thickness of the sample 24, which may be moving film, even if the index of refraction of the test sample is unknown or changes over time.

Still referring to FIG. 3B, the signals $CS_1$ and $CS_2$ propagate through the optical fibers 18 and 34, respectively, and are combined in optical coupler 16 into a third composite signal $CS_3$. The signal $CS_3$ exits the optical coupler 16 through the port 16b and propagates through an optical fiber 40 to a Mach-Zehnder type optical interferometer 53. The optical interferometer includes optical fibers 44, 46, and 50, optical path length modulator 48, and optical couplers 42 and 52. The optical coupler 42 has a port 42a which receives composite signal $CS_3$ from the optical fiber 40. The optical coupler 42 divides composite signal $CS_3$ into composite signals $CS_4$ and $CS_5$. Signal $CS_4$ exits a port 42b of the optical coupler 42 and propagates through the optical fiber 44 and a port 52a of the 2×2 optical coupler 52. The signal $CS_5$ exits a port 42c of the optical coupler 42 and propagates through an optical fiber 46, the path length modulator 48, optical fiber 50, and into a port 52b of the optical coupler 52. The optical fiber 44 provides a fixed length optical path through the interferometer 53. The optical fibers 46 and 50, and path length modulator 48, comprise a variable length optical path through the interferometer 53.

Referring again to FIG. 3B, the path length modulator 48 is controlled to vary the optical path length traversed by signal $CS_5$ at a rate which may be constant, linear, or sinusoidal.

The detector 56 detects interference resulting from the combining of signals $CS_4$ and $CS_5$ in the coupler 52 if the amount of the shift, or change in the optical path length, imparted to the signal $CS_5$ by the path length modulator 48 is such that previously shifted signals are realigned within the coherence length of the optical source 12. When portions of the signals $CS_5$ and $CS_4$ are realigned by the path length modulator 48, these portions interfere.

The signals CS₄ and CS₅ are combined into a composite signal CS₆ in the optical coupler 52. An optical detector 56 receives the signal CS₆ from a port 52c of the optical coupler 52 via the optical fiber 54. The optical detector 56 transforms optical signal CS₆ into an electrical signal 61 having a shape and magnitude analogous to the optical signal CS₆. A display 59a, such as a storage oscilloscope, and/or a digital data processor 65, each may receive the electrical signal 61 and process it so that it may be interpreted. An oscilloscope, for example, may display a signal trace representing the thickness of the sample 24. The data processor 65 may implement a suitable processing routine to determine the unknown thickness of the sample 24.

Figure 8:
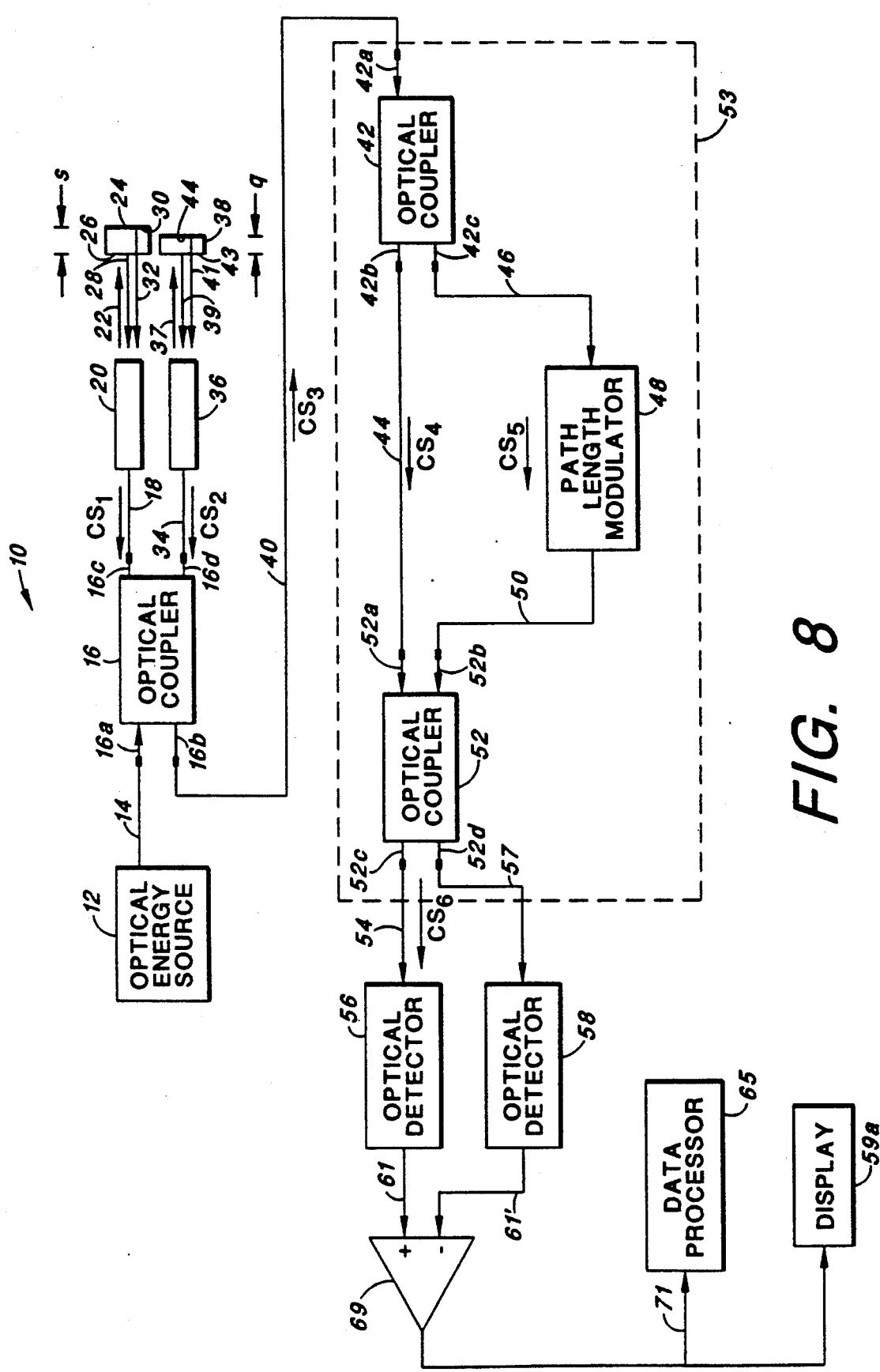
FIG. 8 illustrates an implementation of the system of the present invention using a two optical detectors.

Optionally, as shown in FIG. 8, an optical detector 58 receives a sample of the signal CS₆ through port 52d of the optical coupler 52 and an optical fiber 57. The optical detector 58 transforms the sample of optical signal CS₆ into analogous electrical signal 61'. Optional optical detector 58 may be used when it is desirable to substantially eliminate background noise in the signal CS₆, a well known signal processing technique. In such case, the output signals 61 and 61' are provided to the positive and negative inputs, respectively, of a summing amplifier 69. The output signal 71 of the summing amplifier 69 is then received by the display 59a and/or the data processor 65.

Coherence, Shifting, and Realignment

Figure 4:
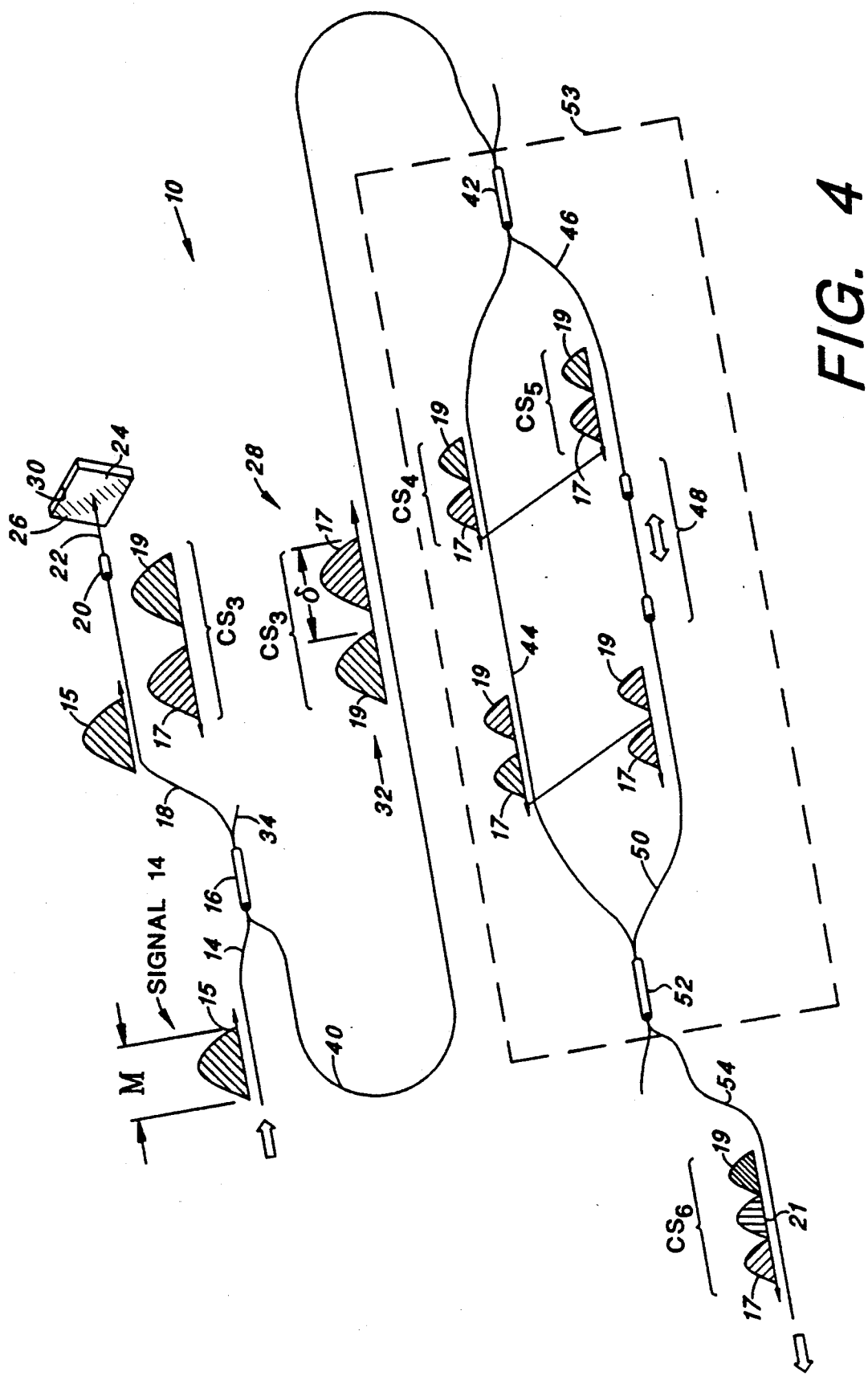
FIG. 4 illustrates the relative coherence of optical signals propagating through the system of FIG. 1.

FIG. 4 illustrates the coherence, shifting, and realignment of the optical signals which propagate through the various components of the system 10. Referring to FIG. 4, there is shown a bell-shaped curve 15 representing a region of coherence having a length, M, associated with the optical signal 14. The signal 14, generated by the optical energy source 12 of FIG. 3B propagates through the optical fiber 14, optical coupler 16, and optical fiber 18, and is emitted from the collimating lens 20 as the signal 22. As previously described, the signal 22 is split into two signals when it partially reflects off of the first reflective surface 26 of test sample 24 and partially reflects off of the refractive interface 30 at the second, e.g., rear (or back) surface of the test sample. The coherence length of the optical signal 28 of FIG. 3B, reflected off of the surface 26, is represented by a bell-shaped curve 17. The coherence length of the signal 32 of FIG. 3B is represented by the bell-shaped curve 19. The optical beams represented by the curves 17 and 19 comprise the signal CS₃. It can be seen that the region of coherence of the wavefront 19 lags the corresponding region of coherence 17 by a distance, δ. It is to be understood that references to the curves 17 and 19 also refer to the signals 28 and 32, respectively.

If δ equals zero, then the phase angle between the signals 28 and 32 is zero, and the two signals combine to constructively interfere with one another. In fact, when δ=0, constructive interference is at a maximum, resulting in a maximum intensity, "I," for the combined signals. Recalling that M represents the coherence length of the optical energy source 12, then if 0<δ<M, the two signals 28 and 32, which each comprise components of the composite signals CS₄ and CS₅, partially interfere with each other, either constructively or destructively, depending on the precise phase angle between the signals. If δ>>M, there is no interference between the signals 28 and 32. Simply stated, if the coherence lengths of signals 28 and 32 overlap, interference occurs; if there is no overlap of coherence regions, no interference occurs.

Referring still to FIG. 4, the reflected signals 28 and 32, when combined into the composite signal CS₃ by the lens 20, do not interfere because they are spatially separated by a distance (twice the thickness of the test sample 24 multiplied by the refractive index of the sample) which typically is much greater than the coherence length of the optical energy source 12.

After reflecting off the test sample 24, the signals 17 and 19, as components of the composite signal CS₃, propagate together to the interferometer 53 where the optical signal CS₃ is split by the optical coupler 42 into the signals CS₄ and CS₅. The optical path length modulator 48 is used to vary the optical path length traversed by signal CS₅. By way of example, the path length modulator 48 is shown in FIG. 4 to have shifted the coherence region 17 of the signal CS₅ ahead of the corresponding coherence region 17 of the signal CS₄ by a distance equal to about the distance δ. The separation of the two back reflected signals 17 and 19, is thus eliminated (δ=0) so that the realigned portions of signals CS₄ and CS₅ interfere. Such realignment of coherence regions 17 and 19 is represented by a bell-shaped curve 21 comprising, in part, the composite signal CS₆ shown in FIG. 4. The amount of change in the optical path length of the signal CS₅ through the path length modulator 48 necessary to eliminate the optical path length difference between the signals 28 and 32 (which each comprise the signals CS₄ and CS₅) is used to determine the unknown thickness of the test sample 24. Thus, portions of the signals 28 and 32 are realigned so that the phase difference between these portions is comparable to or less than the coherence length of the optical energy source.

Advantageously, the operation of the invention does not depend on the overall optical path lengths through system 10 so long as optical signal attenuation does not become excessive, and the optical path modulator 48 is capable of realigning the signals 28 and 32. One benefit of this feature is that sample 24 may be tested at a location and within an environment remote from the optical interferometer 53, optical energy source 12, and optical detector 56.

Non-Fiber Optic Embodiment

Figure 16:
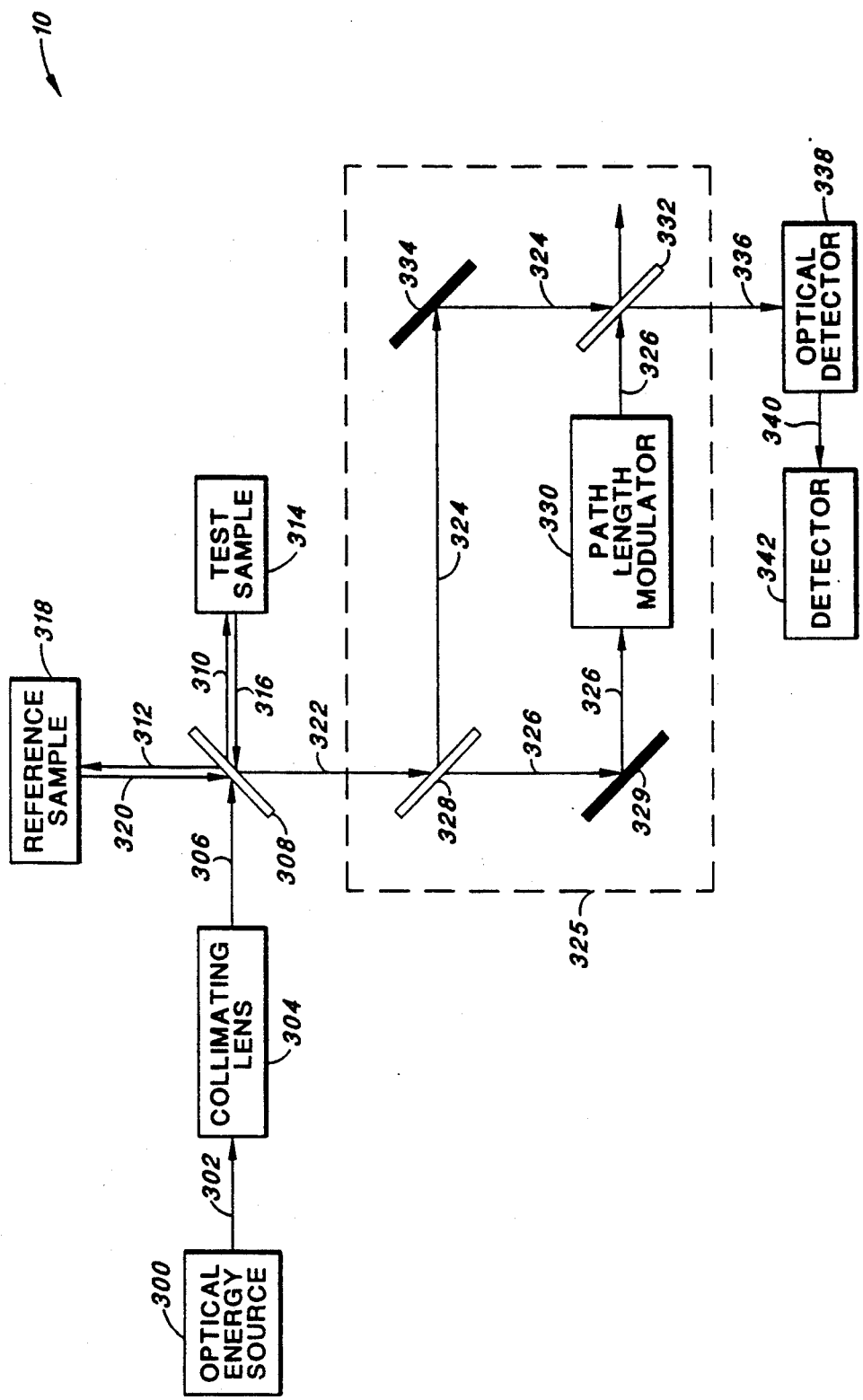
FIG. 16 depicts an example of one implementation of the system of FIG. 3A using bulk-optic components.

Although the system 10 has been described as employing fiber optic components, it is to be understood that the scope of the invention comprehends the use of bulk optic components. For example, referring now to FIG. 16, there is shown system 10 comprising optical energy source 300, which may for example be a light emitting diode, generating a light beam 302 which is received by a collimating lens 304. The collimating lens 304 outputs a collimated light beam 306 which is divided by beam splitter 308 into light beams 310 and 312. The light beam 310 interrogates a test sample 314 having an unknown thickness, as previously described. The interaction of the light beam 310 with the reference sample 314 produces the reflected beam 316 which is received by the beam splitter 308. Similarly, the interaction of the beam 312 and the reference sample 318, having a known thickness, produces reflected beam 320 which is also received by the beam splitter 308. In applications of the system 10 for determining an unknown thickness of the test sample, the test and reference samples preferably have identical refractive indexes, as for example where they are comprised of identical material.

The beam splitter 308 combines the light beams 316 and 320 into composite beam 322 which is provided to a Mach-Zehnder type optical interferometer 325 where the beam 322 is split into beams 324 and 326 by a beam splitter 328. The beam 326 is reflected by reflector 329 so that it is received by the path length modulator 330. The optical path length of the beam 326 through the path length modulator 330 is varied to shift the beam 326 with respect to the beam 324. After exiting the path length modulator 330, the beam 326 is combined by beam splitter (combiner) 332 with the light beam 324, reflected off of the reflector 334, to produce a light beam 336. The light beam 336 is detected by an optical detector 338 which transforms the optical signal 336 into an analogous electrical signal 340. The interference between the light beams 326 and 324 is encoded in the light beam 336 and is discernable by a detector 342 as a voltage waveform resulting from interference between the two beams 326 and 324. Beam splitters 308, 328, and 332 may be implemented as partially reflective mirrors, or as prism beamsplitters.

System Implementation

Figure 5:
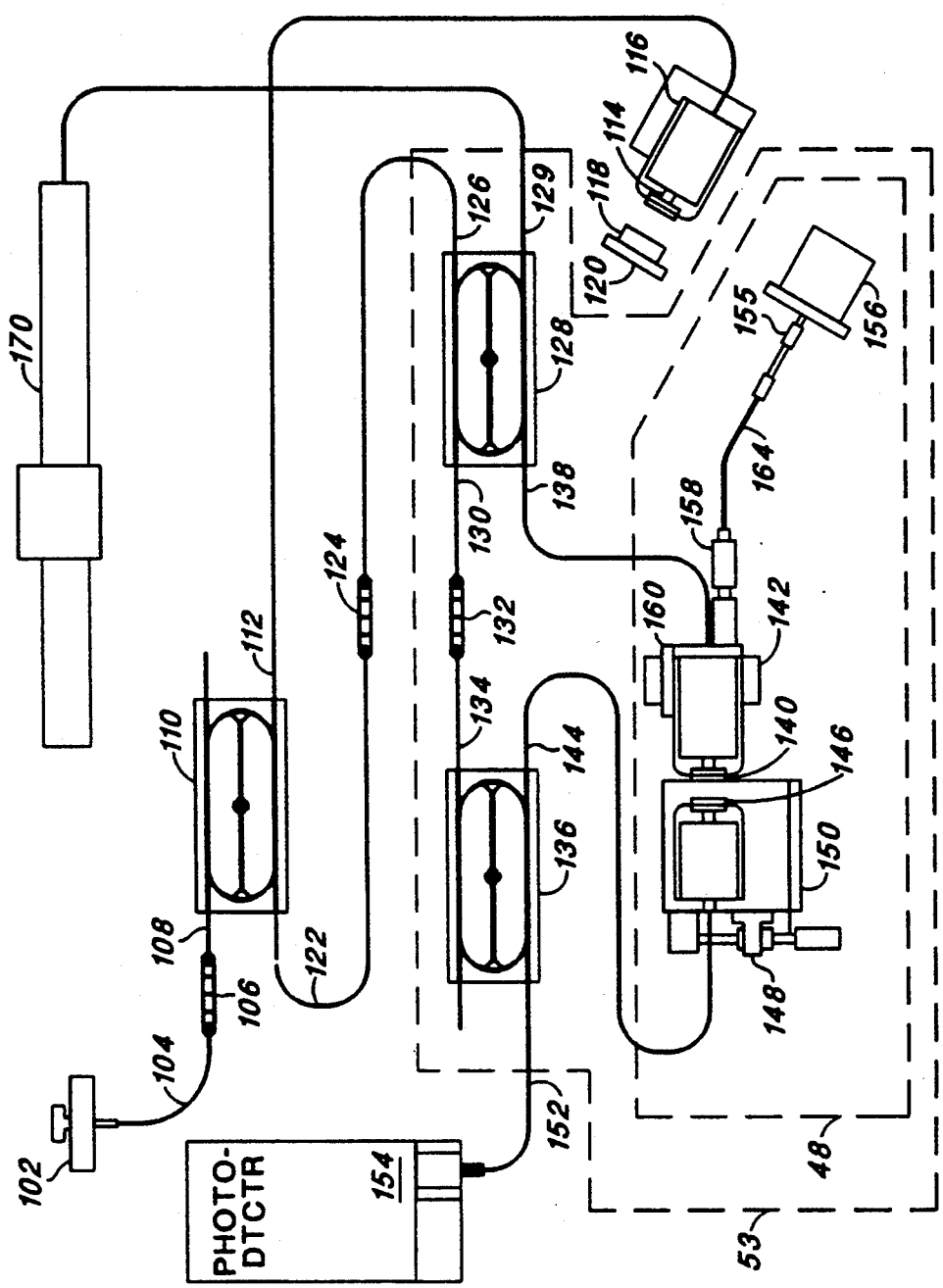
FIG. 5 is a plan view illustrating one example of the implementation of a system of the type illustrated in FIG. 3A.

Turning next to FIG. 5, an example of one implementation of the system 10 is illustrated. However, it is to be understood that the scope of the invention is not limited to the particular embodiment described with reference to FIG. 5. As seen in FIG. 5, the system 10 includes an optical energy source 102 which may be a light emitting diode having a single mode optical fiber output 104. By way of example, the optical energy source 102 may be implemented as a 1300 nm LED manufactured by MRV, Model No. MRED SP010, having a 40 nm spectral width (FWHM) with a coherence length of about 40 microns. The optical fiber output 104 is optically coupled via an optical fiber splice 106 to a port 108 of an optical coupler 110. A port 112 of the optical coupler 110 is aligned with a graded index lens 114 by means of a fiber optic alignment mount 116. An optical signal 112 is emitted from the lens 114 to interrogate an optically transmissive test sample 118 having an unknown thickness to be determined, held in place by a mirror mount 120. An example of a suitable mirror mount is Newport Model No. MM2-1A. A port 122 of optical coupler 110 is optically coupled via an optical fiber splice 124 to a port 126 of a fiber optic coupler 128 of a Mach-Zehnder type interferometer 53. The interferometer 53 also comprises a path length modulator 48 and an optical coupler 136. An example of one type of optical coupler suitable for use in conjunction with the present invention is a Model No. 1310-COA-50/50 coupler available from Gould.

A port 130 of the optical coupler 128 is optically coupled via an optical fiber splice 132 to port 134 of the optical coupler 136. A port 138 of optical coupler 128 is aligned with a graded index lens 140 by means of a fiber optic alignment mount 142, such as a Newport Model No. 460-X mounted to translation stage 160. Similarly, a port 144 of the optical coupler 136 is aligned with a graded index lens 146 by means of a fiber optic alignment mount 148. The optical axis of the lens 146 is optically aligned with the optical axis of the lens 140 by means of a translation stage 150, which may be a Newport Model No. F-926. The optical axis through the lens 146 or through any other optical device is the path which is traversed by light propagating through the foci, vertices and/or geometric center of the optical surfaces of an optical component, such as a lens. Two devices are said to be optically aligned when light propagates from the foci, vertices or geometric center of one device to those of another. A coupler port 152 of optical coupler 136 is optically coupled to a photodetector 154. The photodetector 154 generates an electronic output signal in response to receiving an optical input signal via port 152 of optical coupler 136. By way of example, a suitable type of photodetector 154 may be a Hewlett-Packard Model No. 81512A photodiode detector.

Still referring to FIG. 5, the position of the lens 140 along the optical axis of the lens 140 is controlled by rotation of a knob 158 of the translation stage 160. The knob 158 is rotated at constant speed by torque transmitted by a flexible coupling shaft 164 having one end connected to the knob and the other end connected to a rotatable shaft 155 of a stepper motor 156. The rotary output of shaft 155 is thereby converted to longitudinal translation of lens 140 at a constant speed by means of the translation stage 160. Translation of lens 140 from rotation of knob 158 by stepper motor 156 results in either the widening or narrowing of the air gap between lenses 140 and 146, depending upon the direction of rotation of the knob. Such translation changes the optical path length between the lenses 140 and 146 relative to the fixed path length through the coupler legs 130 and 134.

The path length modulator 48, by way of example, is generally comprised of lenses 140 and 146, fiber optic alignment mounts 142 and 148, translation stages 150 and 160, adjustment knob 158, stepper motor 156 and flexible shaft 164. The stepper motor 156 is controlled by conventional means, not shown.

The output of an alignment laser 170 may be optically coupled to a port leg 129 of optical coupler 128 to facilitate optically aligning the optical components of system 10 in accordance with techniques well known by those skilled in the art.

Alternative Implementations

Although disclosed as a light emitting diode, the optical source 102 may also be implemented as a frequency modulated laser with a time averaged coherence length comparable to that of a light emitting diode (40-100 $\mu$m), or it may be any other optical source having a finite coherence length suitable for a particular application.

The translation stage 160 is disclosed as being driven by a stepper motor, however, any other suitable positioning device, such as a piezoelectric translator may also be employed to provide such translation function. By way of example, a suitable piezoelectric translator is a Physic Instrument, Model P-287.70 Microblock Translator.

Figure 6:
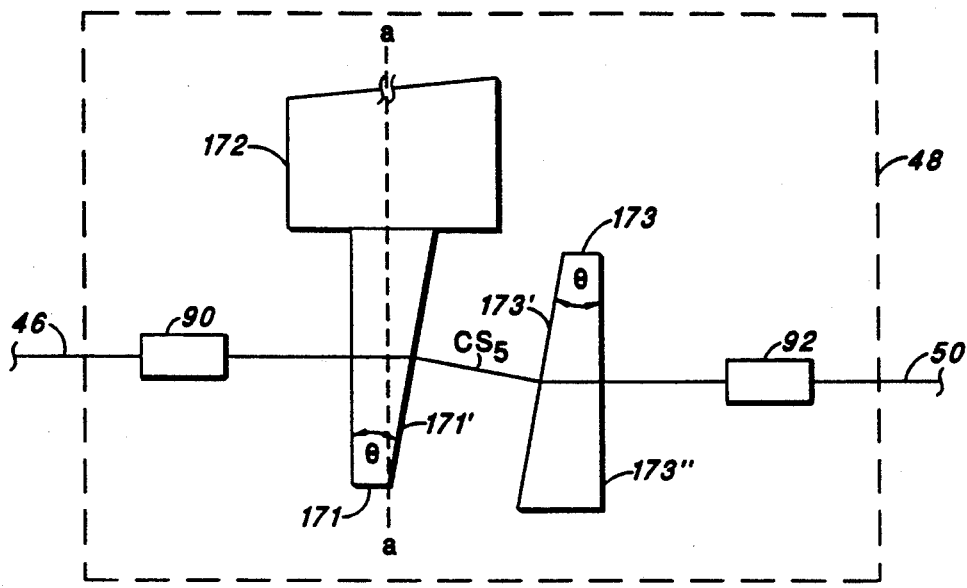
FIG. 6 shows one example of the path length modulation means of FIG. 3B that employs a linear translatable optically transmissive wedge prism.

Referring next to FIG. 6, the path length modulator 48 of FIG. 3B may include a wedge prism 171 interposed to translate between collimating lenses 90 and 92. The translation of the prism 171 may be in either direction along the axis a—a. The lenses 90 and 92 are optically coupled to optical fibers 46 and 50, respectively, as shown in FIG. 3B. The translating wedge prism 171 is interposed in the path of the signal $CS_5$ and translated along the axis a-a in order to vary the optical path length of the signal $CS_5$ between the lenses 90 and 92 as the signal propagates through the prism 171. After exiting the lens 90, the signal $CS_5$ enters the wedge prism 171 at an incidence angle of 90°, and is refracted upon exiting the prism through the oblique surface 171'.

Besides providing a varying optical path length, another advantage of the translating wedge prism shown in FIG. 6 is that a low wedge angle $\theta$, as for example, 2 degrees, provides a mechanical advantage whereby micron-sized optical path length changes are obtained by tens of microns of optical wedge translation along the axis a—a, thereby allowing very fine changes in the optical path length of the signal $CS_5$ to be realized with relatively course changes in wedge position.

In order to compensate for the effects of the refraction of the signal $CS_5$ as is exits the oblique surface 171', a stationary wedge prism 173 is interposed between the prism 171 and the collimating lens 92. The wedge angle of the prism 173 is also $\theta$. The non-normal surfaces 171' and 173' of the prisms 171 and 173, respectively, face each other and are parallel to each other. Compensation for the refraction of the signal $CS_5$ as it is emitted from the surface 171' is provided by the prism 173. The refracted signal is refracted again as it propagates through the oblique surface 173' of the prism wedge 173 so that the signal $CS_5$ propagates in a direction parallel to, although slightly offset from the path that the signal was traveling when it was emitted from the lens 90. The signal $CS_5$ exits the prism 173 through a surface 173" normal to the optical axis of the lens 92. Therefore, the optical axes of the collimating lenses 90 and 92, which preferably are parallel, are slightly offset by a fixed distance.

The wedge prism 171 is mounted to a linear actuator 172 which is enabled to selectively translate the wedge prism 171 in either direction along the axis a—a, perpendicular to the optical axis of lens 90. Linear actuators are well known by those skilled in the art. Thus, it can be appreciated that the optical path length of the optical signal $CS_5$ changes between fixedly positioned lenses 90 and 92. Such change in the optical path length may result from the signal $CS_5$ traversing either a progressively wider or narrower section of the wedge prism 171.

Figure 7:
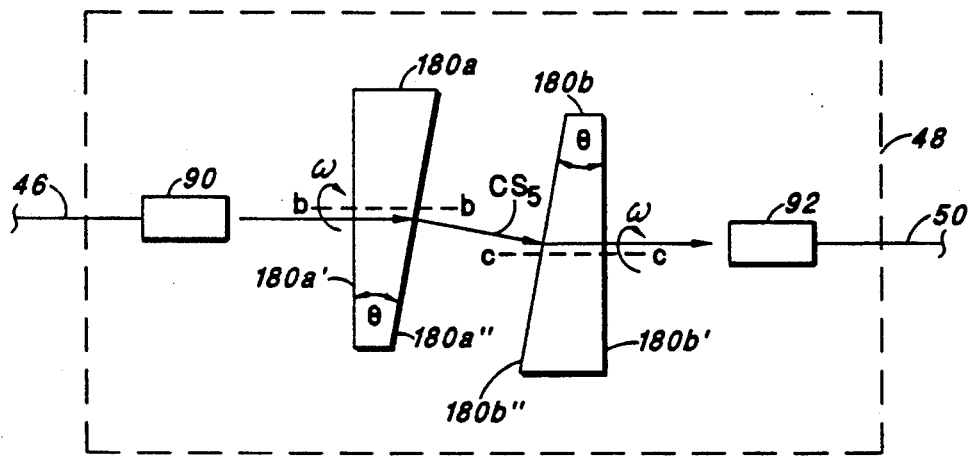
FIG. 7 shows one example of the path length modulation means of FIG. 3B that employs a rotating circular wedge prism.

The optical path length modulator 48 shown in FIG. 3B may also be implemented as depicted in FIG. 7, where collimating lens 90 is shown to emit the signal $CS_5$. The signal $CS_5$ is directed to enter at the geometric center of the optical surface 180a' of a circular wedge prism 180a having a wedge angle of $\theta$. The wedge prism 180a rotates about its centroidal axis b—b. The surface 180a' is normal to the optical axis of the lens 90. The signal $CS_5$ propagates through the circular wedge prism and exits therefrom through surface 180a". The oblique surface 180a" refracts the signal $CS_5$. In order to compensate for such refraction, the signal $CS_5$ is directed to be refracted back in a direction parallel to that which the signal $CS_5$ was traveling as it was emitted from the lens 90. Such refraction compensation is provided by another circular wedge prism 180b also having a wedge angle $\theta$. By way of example, the circular wedge prisms each may be implemented as Melles Griot, Part No. 02PRW001.

The signal $CS_5$ is refracted by the oblique surface 180b" of the prism 180b and exits the prism 180b through the surface 180b", normal to the optical path of the signal $CS_5$. The oblique surface 180b" is parallel to and faces the oblique surface 180a". The prism 180b also rotates about its centroidal axis c—c in the same direction and at the same speed as prism 180a such that the surfaces 180a" and 180b" remain parallel. The rotational axes, a—a and b—b, are parallel and offset by a fixed distance. Thus, it may be appreciated that rotating the wedge prisms at a constant angular rate provides a sinusoidally varying optical path length through the path length modulator 48 due to the rotation of the prisms.

Figure 9:
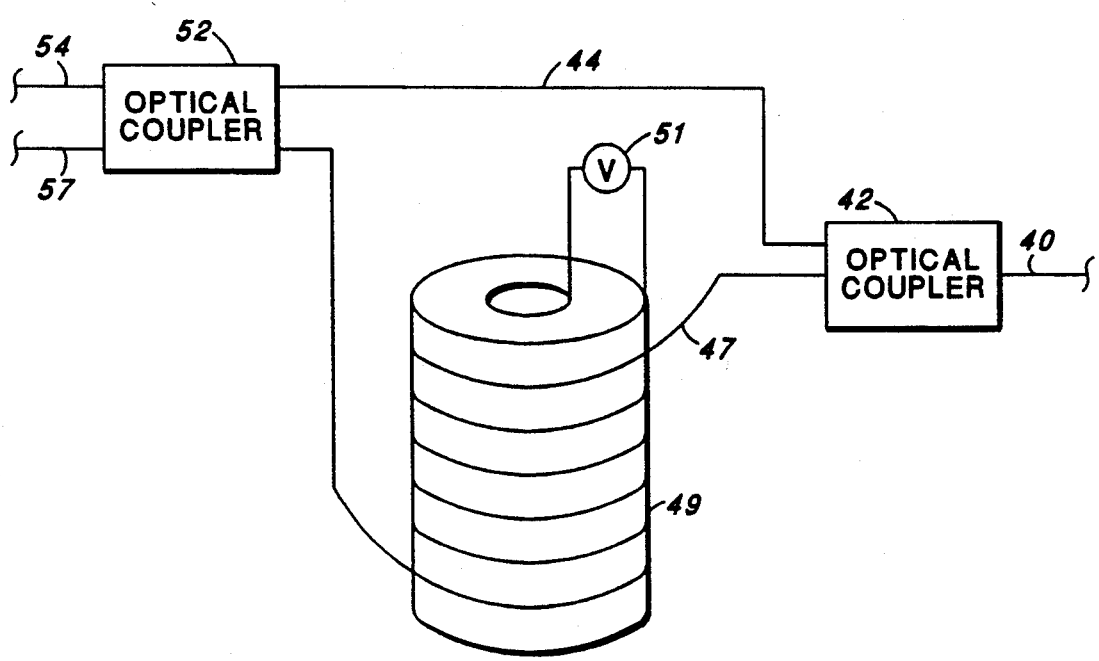
FIG. 9 depicts one example of the path length modulation means of FIG. 3B that employs an optical fiber looped around a piezoelectric cylinder.

Another embodiment of the optical path length modulator 48 (FIG. 3B) may be implemented as shown in FIG. 9 to include a length of an optical fiber 47 optically coupled between the optical couplers 42 and 52 (FIG. 3B) and snugly coiled in one or more loops around a piezoelectric cylinder 49. Voltage 51 applied to the cylinder 49 causes the optical fiber 47 to resiliently stretch (strain), thereby stretching the optical fiber 47 and lengthening the optical path through the fiber. When such voltage 51 is removed, the optical fiber 47 returns to its original length. By way of example, the piezoelectric cylinder 49 may be implemented using a Vernitron Model PZT-5A.

Interferometer Output Signal

Figure 10:
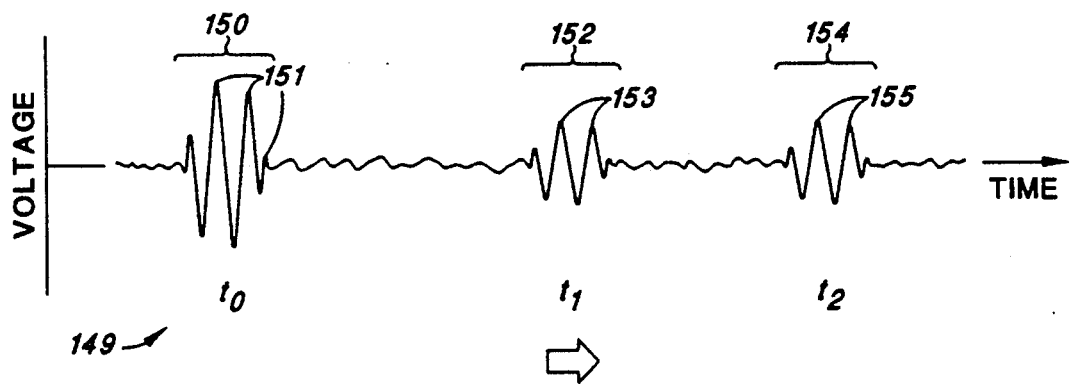
FIG. 10 illustrates how information can be extracted from an oscilloscope trace, or equivalent display device, to determine characteristics of the test sample of FIG. 3B.

Referring next to FIG. 10, there is shown a representative signal trace 149 of a storage oscilloscope, or similar device, exemplifying the display 59a (hereinafter referred to as the "oscilloscope") representing the electrical output signal 61 from the optical detector 56 of FIG. 3B. The trace 149 is representative of the signal 61 which may result from translating the wedge 171 of FIG. 6 at a constant speed to vary the optical path length of composite signal $CS_5$ through the optical path length modulator 48 of the interferometer 53. The trace 149 includes three packets, 150, 152, and 154. The ordinate (vertical) axis in FIG. 10 represents the voltage output of the optical detector 56, and the abscissa (horizontal) axis represents time. The packets represent detection by the optical detector 56 of interference between the optical signals $CS_4$ and $CS_5$. The trace 149 is recorded as the optical path length between the lenses 90 and 92 of the optical path length modulator 48 changes linearly with respect to time. The packets are identifiable as a series of voltage pulses which exceed predetermined levels, as for example, the voltage level corresponding to noise output by the detector.

Figure 11:
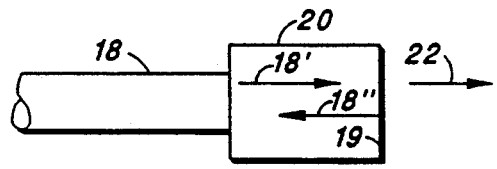
FIG. 11 shows the internal reflection of an optical signal in a collimating lens.

Packet 150 is obtained by changing the optical path length through the path length modulator 48, as described above so that the fixed and variable length arms of the interferometer are equal in length. Referring momentarily to FIG. 11, the packet 150 may result from the internal reflection of a signal 18' propagating through the optical fiber 18 that partially reflects as signal 18" off of the refractive interface 19 at the surface of collimating lens 20. The signal 18' may be provided by optical energy source 12. When the signals $CS_4$ and $CS_5$ are realigned by a change in path length through the path length modulator, packet 152 (FIG. 10) is presented on the screen of the oscilloscope, or equivalent display device. The packet 152 represents realignment of the reflected signals 32 and 28 that partially comprise the composite signals $CS_4$ and $CS_5$. Further change in the path length traversed by the signal $CS_5$ results in realignment of the reflected signals 39 and 41 which also partially comprise signals $CS_4$ and $CS_5$. Successive realignment of the pairs of signals 28 and 32, and of signals 39 and 41, results in interference between the signals comprising each of these pairs. Such interference manifests as the distance voltage pulses that comprise the packets 152 and 154 of the trace 149 shown in FIG. 10.

The center of the packet 150, $t_o$, represents zero thickness. With the thickness of the reference sample known to be (but not by how much) thicker than the unknown thickness of the test sample, then as shown in FIG. 10, the center $t_1$ of the packet 152 represents the unknown thickness of the test sample 24 FIG. 3B, and the center $t_2$ of the packet 154 represents the known thickness of the reference sample 38 of FIG. 3B.

In the case where the thickness of the test sample is known to be (but not by how much) greater than the thickness of the reference sample, the center of the middle packet 152 would represent the thickness of the reference sample, and the center of the packet 154 to the right of the trace would represent the unknown thickness of the test sample.

Sample Thickness Calculation

The path length modulator 48 introduces a path length difference, d, between the signals $CS_4$ and $CS_5$, as previously described. The path length modulator 48 may be driven at a constant linear speed by appropriate control, as for example, using the stepper motor 156 depicted in FIG. 5, as would be well known by those of ordinary skill in the art. In such case, d is a linear function of time:

$$d(t) = kt + b,$$

where k represents the speed at which the path length changes, and b represents the initial path length difference between the paths traversed by signals $CS_4$ and $CS_5$.

Packets occur at path length differences, d, given by:
$d_o = 0 = kt_0 + b$
$d_1 = 2ns = kt_1 + b$
$d_2 = 2nq, = kt_2 + b$ where n represents the index of refraction of both the test and reference samples, s represents the unknown sample thickness, and q represents the known thickness of the reference sample. Given that $2n = d_2/q$, the unknown thickness S may be determined as follows:

$$s = d_1/2n = (d_1/d_2)q = \frac{(d_1 - d_0)}{(d_2 - d_0)} q$$

With linear path length modulation as described above the unknown thickness is computed directly from the measured packet detection times:

$$s = q[(kt_1 + b) - (kt_0 + b)]/[(kt_2 + b) - (kt_0 + b)] \quad (1)$$
$$= q(t_1 - t_0)/(t_2 - t_0)$$

Equation (1) provides the basis by which the unknown thickness of a test sample may be determined. From this equation, it can be seen that one can ascertain the times $t_o$, $t_1$, and $t_2$ from the screen of an oscilloscope, measure the distance q, and then calculate the value of the unknown thickness, s. Thus it may be appreciated that an oscilloscope may provide a signal trace functionally related to and representative of the unknown distance s. For both linearly and sinusoidally driven optical path length modulation, the identical indices of refraction for the test sample 24 and the reference sample 38 conveniently cancel out. Thus, thickness measurements of the sample are independent of the index of refraction of the sample. This important characteristic of system 10 allows real-time monitoring of the thickness of optically transmissive materials while they are being manufactured. Such monitoring can provide a feedback signal which may be used to control the manufacture of products incorporating such optically transmissive materials.

Synchronous Detection and Data Processing

Figure 3C:
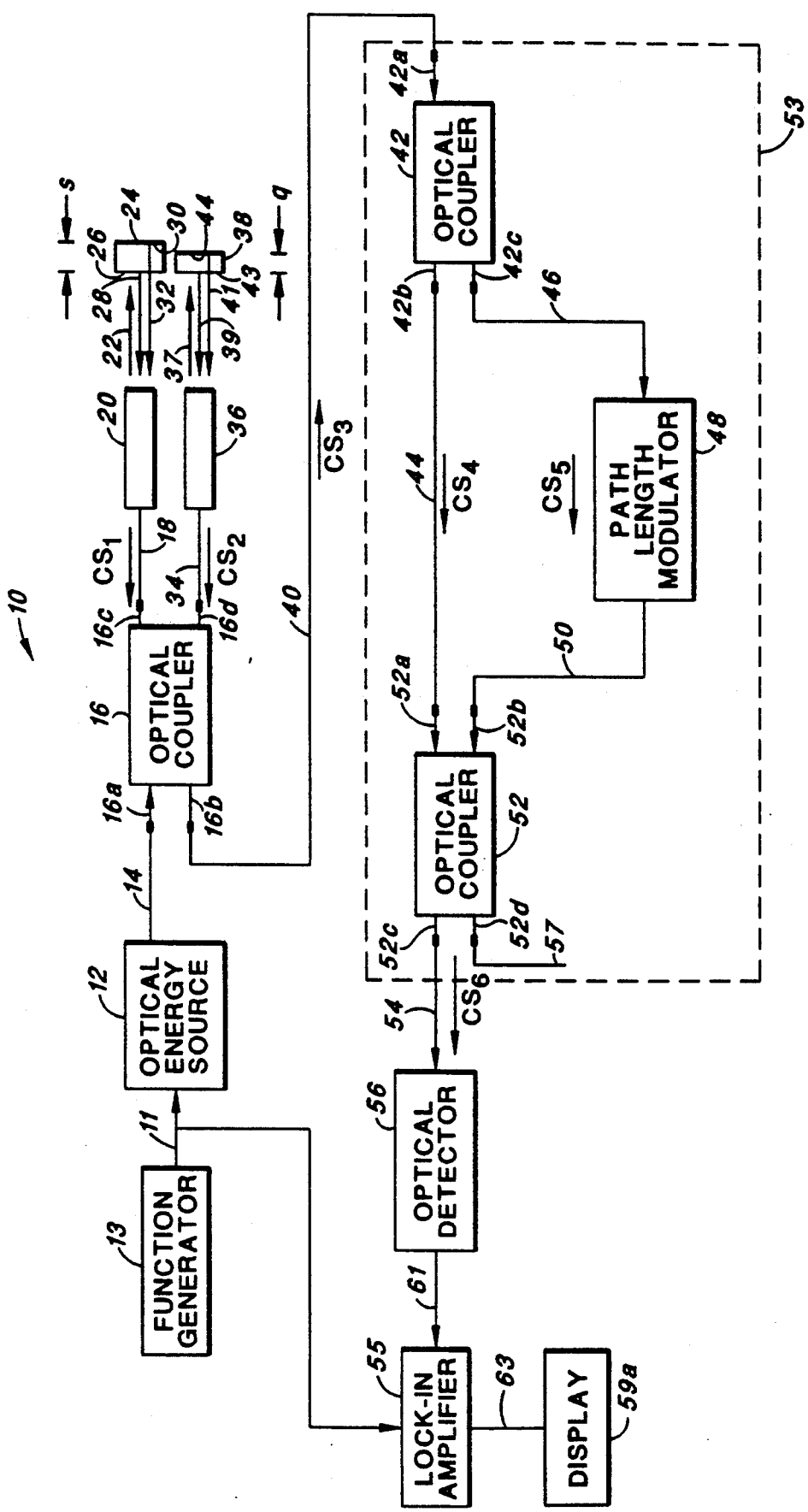
FIG. 3C is a functional block diagram of a second example of the system of FIG. 1 that employs a modulated light signal to reduce signal noise.

The system 10 described above with reference to FIG. 3B may be modified as shown in FIG. 3C to further include a function generator 13 which provides a modulation output signal 11 to the optical energy source 12 in order to modulate optical signal 14. Preferably, the output signal 14 is sine wave modulated at a frequency on the order of 1-10 KHz. The system 10 may also include a lock-in amplifier 55 which receives the electrical signal 61 from the optical detector 56 and generates an output signal 63 which is provided to display 59a in synchrony with modulation signal 11 received from the function generator 13. The advantage of modulating the output of the optical energy source 12 in synchrony with the modulation signal 11 is improvement in the signal-to-noise ratio of the data signals 63 provided to display 59a.

Figure 3D:
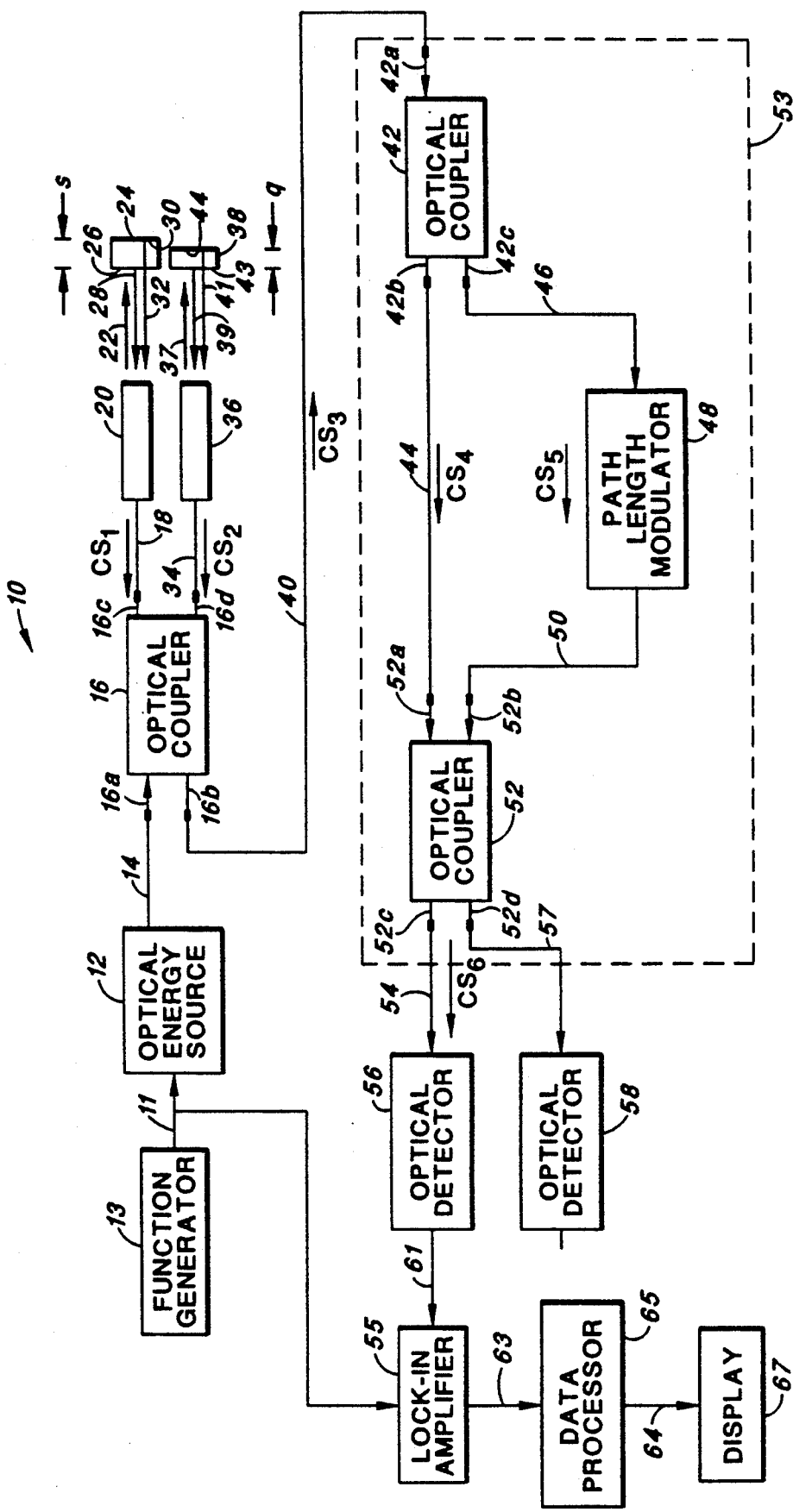
FIG. 3D is a functional block diagram of a third example of the system of FIG. 1 that employs a modulated light signal to reduce signal noise and a digital data processor for implementing a processing routine to determine the thickness of the sample.

The system 10 may also be modified as shown in FIG. 3D to further include a data processor 65 which receives the output signal 63 from the lock-in amplifier 55. The data processor 65 interprets the signal 63 to determine the thickness of the test sample 24 using an appropriate processing routine. The determined thickness of the test sample 24 may be stored in the data processor 65 for subsequent use, and may optionally be provided via signal line 64 to a display 67. The display 67, for example, may be a printer, strip chart recorder, digital display, analog meter, plotter, or storage oscilloscope.

Application of the Invention

The present invention advantageously finds wide application in the manufacture of optically transmissive films of the type commonly use in video and audio recording tape, as well as in photographic films and in the manufacture of thin glass products.

Figure 12:
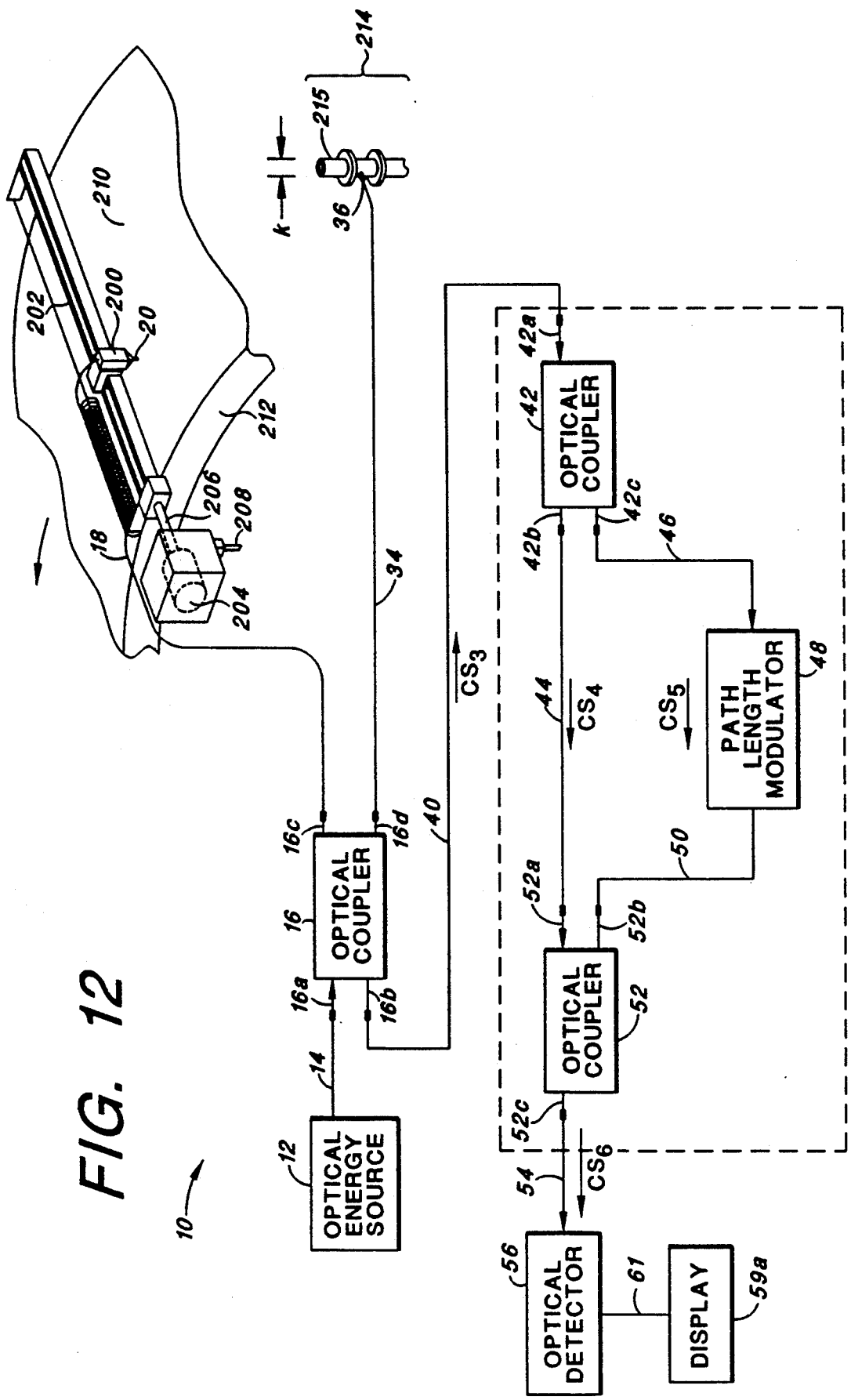
FIG. 12 shows an adaptation of the present invention for monitoring the thickness of an optically transmissive film while being manufactured.

An example of one embodiment of the system 10 for monitoring the manufacture of film is shown in FIG. 12. Referring to FIG. 12, there is shown system 10 further including the collimating lens 20 mounted to a sensor head 200 which translates along a head translation rail 202 and is threadably engaged with a threaded motor shaft 206. A head translation motor 204 drives the threaded motor shaft 206 causing the sensor head 200 to translate axially along the translation rail 202. Power to the motor 204 is provided through a cable 208 coupled to an electric power source, not shown. The motor 204 may be manually or automatically controlled in accordance with techniques well known by those skilled in the art to position the sensor head 200 at appropriate positions along the rail 202. The film 210 has an optically transmissive layer which is illuminated by the optical signal 22, not shown, emitted from the lens 20.

The collimating lens 20 is optically coupled via the optical fiber 18 coupled to the optical coupler 16. The collimating lens 20 is oriented to emit optical signals normal to the optically transmissive layer at the surface of the film 210 as the film rolls about the rotating drum 212, and to receive optical signals reflecting off of the film 210. Thus, the collimating lens 20 can be appropriately positioned to scan anywhere along the width of the film 210, so that the optical character, such as the thickness of the optically transmissive layer of film 210 may be ascertained. The collimating lens 36 is positioned to emit and receive optical signals from an in-line fluid monitor 214. The fluid monitor 214 includes a tube 215 having a very precisely and accurately known inside diameter k, as for example, 1.0 mm, which contains optically transmissive fluid from the same batch of fluid that comprises the optically transmissive layer of the film 210. The diameter, k, provides a reference distance through the optically transmissive fluid which is used to determine the unknown thickness of the optically transmissive medium of the film 210. Thereby, the determination of the thickness of the optically transmissive medium, or layer, of the film 210 is independent of the refractive index of the optically transmissive layer, where such refractive index may vary, depending on the character of the material batch from which the optically transmissive layer is made. The fluid is provided to tube 215 by means, not shown, as would be well known by those skilled in the art. The optical signals emitted and received by the collimating lenses 20 and 36 are generated and processed as previously described above.

Thickness Measurement with no Reference Sample

The system of the present invention may also be adapted to determine the unknown thickness of an optically transmissive medium without reliance on use of a reference sample. In such case, it is necessary to know the index of refraction of the test sample. Such a system is described below with reference to FIG. 17.

Figure 17:
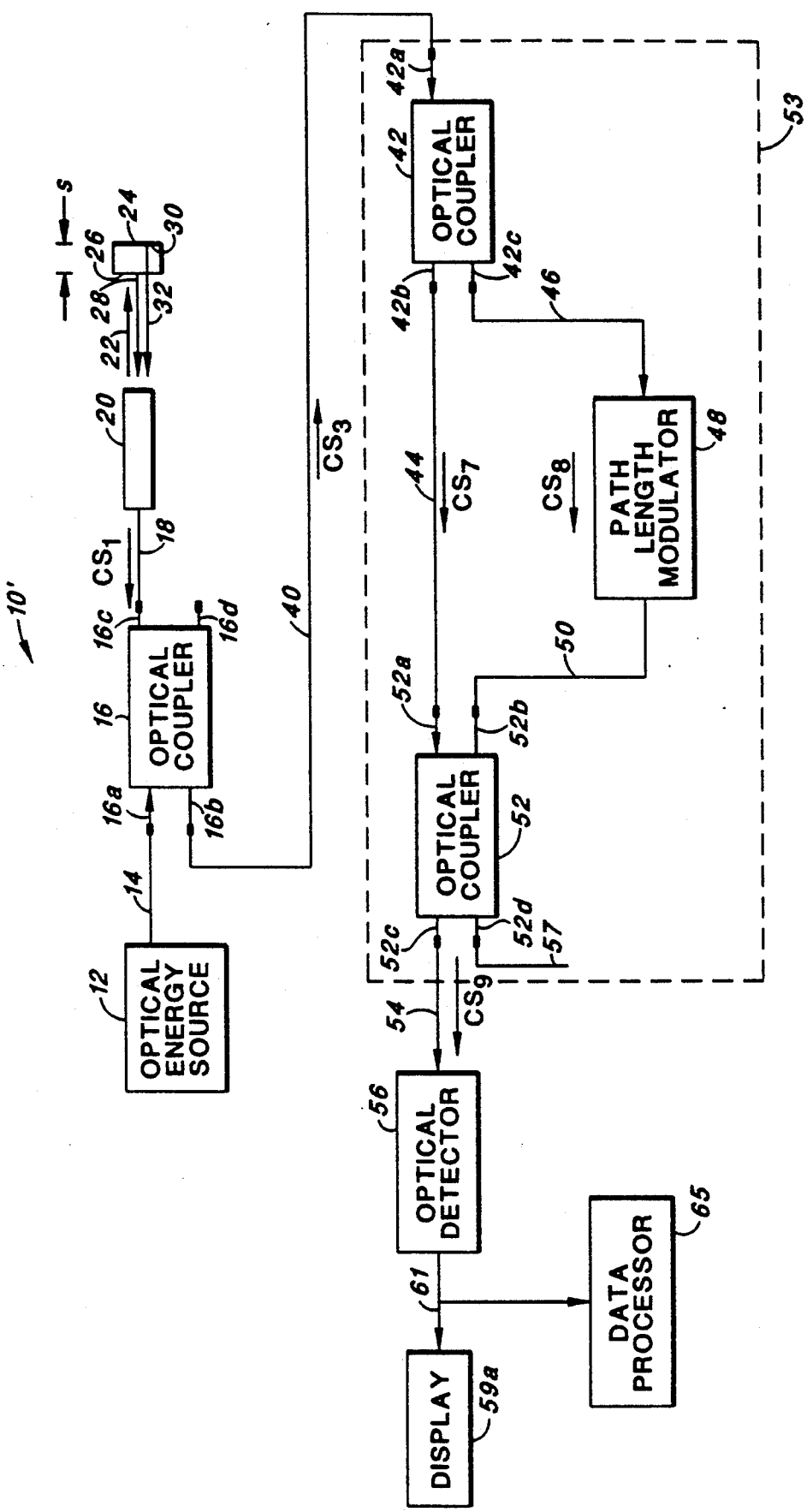
FIG. 17 is a block diagram of a system in accordance with one embodiment of the present invention that determines an unknown thickness of an optically transmissive material without using a reference material.

Referring now to FIG. 17, there is shown a functional block diagram of a system 10' for determining the unknown thickness of an optically transmissive test sample 24 having a known index of refraction. System 10' includes an optical source 12 which may be any optical energy or light emitting device which generates an optical output signal characterized by a coherence length comparable to the minimum distance resolution necessary to suit the requirements of a particular application. The optical energy output from optical energy source 12 is coupled through optical fiber 14 and port 16a of an optical coupler 16.

The signal 14 enters the port 16a of the coupler 16 and enters the optical fiber 18 from the port 16c. The signal 14 then propagates to collimating lens 20 from which it is emitted as the signal 22.

Still referring to FIG. 17, the optical signal 22 emitted from the collimating lens 20 interacts with test sample 24 so as to be divided into two optical signals. One of the signals divided from signal 22 reflects off of the first incident reflective surface 26 of the test sample 24 to provide a reflected signal 28. The other signal divided from signal 22 is the signal 32. The signal 32 represents that portion of the signal 22 that is transmitted through the unknown thickness of the test sample 24 and reflects off a refractive interface 30 of the test sample. The signals 28 and 32 are each reflected back into the collimating lens 20 where they are combined into a composite signal $CS_1$.

The signal $CS_1$ propagates through the optical fiber 18, out of the port 16b of the optical coupler 16, and through the optical fiber 40 to a Mach-Zehnder type optical interferometer 53. The optical coupler 42 divides composite signal $CS_1$ into composite signals $CS_7$ and $CS_8$. Signal $CS_7$ is emitted from the port 42b of the optical coupler 42 and propagates through the optical fiber 44 and the port 52a of the 2×2 optical coupler 52. The signal $CS_8$ exits the port 42c of the optical coupler 42 and propagates through the optical fiber 46, the path length modulator 48, optical fiber 50, and through the port 52b of the optical coupler 52. The signals $CS_7$ and $CS_8$ are combined into a composite signal $CS_9$ in the optical coupler 52. The optical detector 56 receives one portion of the signal $CS_9$ from a port 52c of the optical coupler 52 via the optical fiber 54.

An path length modulator 48 is controlled to change the optical path length traversed by signal $CS_8$ at a constant and accurately known rate. The detector 56 detects interference resulting from the combining of signals $CS_7$ and $CS_8$ in the coupler 52 if the amount of the shift imparted to the signal $CS_8$ by the path length modulator 48 is such that previously shifted signals are realigned within the coherence length of the optical source 12. When portions of the signals $CS_8$ and $CS_7$ are realigned by the path length modulator 48, these portions interfere.

An output signal 61 generated by the optical detector 56 is provided to the display 59a which may be an oscilloscope and/or to the data processor 65.

Figure 18:
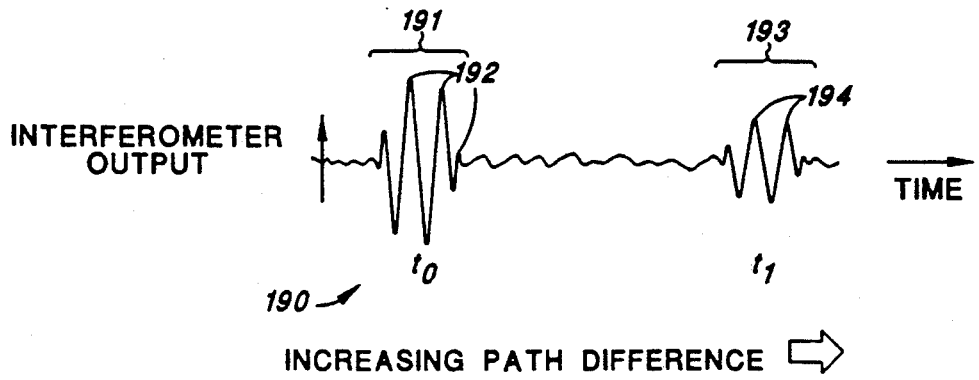
FIG. 18 shows an oscilloscope trace representing the characteristics of an optically transmissive material.

An oscilloscope trace 190, representative of the signal 61 for the system 10', is shown in FIG. 18. The trace 190 is shown to include two packets of voltage pulses. The first, packet 191 is comprised of a series of voltage pulses 192 and represents zero thickness. Packet 193, comprised of voltage pulses 194 represents the unknown sample thickness. The signal trace 190 is representative of an example of a constant rate of change in the optical path length of the path length modulator 48.

The unknown thickness of the test sample 24 may be determined in accordance with the following equations:

$$s = (d_1 - d_0)/2n = [(kt_1 + b) - (kt_0 + b)]/2n \quad (2)$$
$$= (t_1 - t_0)k/2n$$

where $t_1$ represents the center of packet 193, $t_o$ represents the center of packet of 191, k represents the rate of change of the path length modulator 48, and n represents the known index of refraction of the test sample 24.

The values of $t_o$ and $t_1$ may be discerned directly from the oscilloscope trace 149. The value of k is known because a human operator may establish the rate at which the optical path length of the path length modulator 48 changes. For example, if the optical path length is changed by actuation of the stepper motor 156, as shown in FIG. 5, the output of the stepper motor may be controlled to establish a specific speed at which the optical path length between the lenses 146 and 140 changes. If the optical path length of the path length modulator 48 is changed by displacement of a translating wedge prism, such as prism 171 described with reference to FIG. 6, the linear activator 172 may be controlled to be actuated at a specific speed. Therefore, all of the variables necessary to determine the unknown sample thickness, s, are available.

Output signal 61 may also be provided to a digital data processor, such as data processor 65. A suitable processing routine may be implemented in the data processor which employs Equation (2) to determine the value of s in accordance with well known numerical and signal processing techniques. When equation (2) is employed to determine the unknown thickness of the test sample 24, the value of k may be input as a parameter into the processing routine. Alternatively, the processing routine may establish the value of k and directly control the rate at which the optical path length through the path length modulator changes.

Refractive Index Measurement with Reference Sample

The system of the present invention may also be implemented to determine an unknown index of refraction of a test sample having a known thickness. Such embodiment finds application in manufacturing environments where it is desired to ascertain the identity of optically transmissive materials for quality control purposes. However, in the application of the system lo where it is desired to determine the refractive index of a test sample, such as test sample 24 of FIG. 3B, it is necessary to know the refractive index and thickness of the reference sample 38, and the thickness of the test sample 24 having the unknown refractive index.

The operation of an embodiment for determining an unknown index of refraction is identical to the operation of system 10, described with reference to FIG. 3B, except that an equation slightly different from equation (1) is employed as the basis for determining the unknown refractive index. In spite of the different equations used to determine a refractive index, an oscilloscope trace of the signals generated by the optical detector 56 would look similar to the trace 149 in FIG. 10. However, the information extracted from the trace 149 is related to the unknown index of refraction rather than to an unknown thickness of the test sample.

In an application of the system 10 where the optical path length of the path length modulator changes linearly with time, the unknown index of refraction, $n_s$, of the test sample 24 may be determined in accordance with the following equation:

$$n_s = q n_r [(t_1 - t_0)/(t_2 - t_0)]/s \qquad (3)$$

where q represents the thickness of the reference sample, $n_r$ represents the known index of refraction of the reference sample, $t_0$ represents the center of the packet 150, $t_1$ represents the center of the packet 152, and $t_2$ represents the center of the packet 154. The values of $t_0$, $t_1$, and $t_2$ may be discerned directly from the oscilloscope trace 149. Therefore, all of the variables necessary to determine $n_s$ are available.

Again, the output signal 61 may also be provided to a digital data processor, such as digital processor 65. A suitable processing routine may be implemented in the data processor employing Equation (3) to determine the value of $n_s$ in accordance with well known numerical and signal processing techniques.

Refractive Index Measurement with no Reference Sample

An embodiment of the system of the present invention may also be implemented to determine an unknown index of refraction of a test sample having a known thickness without reliance on use of a reference sample. The operation of an embodiment for determining an unknown index of refraction is identical to the operation of system 10', described with reference to FIG. 17, except that an equation slightly different from equation (2) is employed as the basis for determining the unknown refractive index. In spite of the different equations used to determine a refractive index, an oscilloscope trace of the signals generated by the optical detector 56 would look identical to the trace 190 in FIG. 18 if the optical path length changes at a constant rate. However, the information extracted from the trace 190 is related to the unknown index of refraction rather than to the unknown thickness of the test sample.

In an application of the system 10 where the optical path length of the path length modulator changes linearly, the unknown index of refraction, $n_2$, of the test sample 24 may be determined in accordance with the following equation:

$$n_s = k[(t_1 - t_0)]/2s \qquad (4)$$

where k represents a linear rate of change of the optical path length of the path length modulator which may be established by an operator, s represents the known thickness of the sample, $t_0$ represents the center of packet 191, corresponding to zero thickness, and $t_1$ represents the center of the packet 193, corresponding to the sample index and thickness. The values of $t_0$ and $t_1$ may be discerned directly from the oscilloscope trace 190. Therefore, all of the variables necessary to determine $n_s$ are available.

While the present invention has been described in terms of preferred embodiments, it is to be understood that the invention is not to be limited to the exact form of the apparatus or processes disclosed. Therefore, it is to be understood that the invention may be practiced other than as specifically described without departing from the scope of the claims.

What is claimed is:

1. A system for determining the thickness of an optically transmissive medium, comprising:

an optical energy source for generating an optical source beam;

optical coupling means for receiving and directing said source beam, said optical coupling means comprising:

means for directing a first portion of said source beam to irradiate an optically transmissive test sample having an unknown thickness between a front surface and a refractive interface such that said first portion of said source beam is divided into a first reflected beam that reflects off the front surface of said test sample, and into a second reflected beam that reflects off the refractive interface of said test sample, said test sample having an index of refraction, n, means for receiving and combining said first and second reflected beams into a first composite beam;

means for directing a second portion of said source beam to irradiate an optically transmissive reference sample having a known thickness between a front surface and a refractive interface such that said second portion of said source beam is divided into a third reflected beam that reflects off the front surface of said reference sample and into a fourth reflected beam that reflects off the refractive interface of said reference sample, said reference sample having said index of refraction, n, means for receiving and combining said third and fourth reflected beams into a second composite beam, and means for combining said first and second composite beams into a third composite beam;

an optical interferometer having a fixed optical path length coupled to receive a first portion of said third composite beam from said first means and a variable optical path length coupled to receive a second portion of said third composite beam from said first means;

an optical path length modulating means coupled to said variable optical path length of said interferometer for changing the length of said variable optical path length to cause optical interference between said first and second reflected beams of said first composite beam, and between said third and fourth reflected beams of said second composite beam; and an optical detector coupled to receive said first and second portions of said third composite beam from said optical interferometer for generating electrical signals representative of said third composite beam, said electrical signals providing an indication of the thickness between the front surface and the refractive interface of said test sample.

2. The system of claim 1 wherein said optical coupling means includes:

a first optical coupler having a first port coupled to receive said source beam from said optical energy source, and second, third, and fourth ports;

a first collimating lens optically coupled to said third port of said first optical coupler; and a second collimating lens optically coupled to said fourth port of said first optical coupler.

3. The system of claim 2 wherein said optical interferometer includes:

a second optical coupler having a first port optically coupled to said second port of said first optical coupler, and second and third ports;

a first optical fiber having a first end optically coupled to said second port of said second optical coupler, and a second end;

a third optical coupler having a first port optically coupled to said second end of said first optical fiber, and second and third ports;

a third collimating lens optically coupled to said third port of said second optical coupler; and a fourth collimating lens optically coupled to said second port of said third optical coupler and optically aligned with said third collimating lens.

4. The system of claim 3 wherein said optical path length modulating means includes:

a wedge prism interposed between said third and fourth collimating lenses and having non-parallel surfaces through which said second portion of said third composite beam emitted by said third collimating lens is transmitted, said wedge prism translating in a direction perpendicular to the optical axis of said third collimating lens.

5. The system of claim 3 wherein said path length modulating means includes:

an optically transparent, circular wedge prism spinning between said third and fourth collimating lenses such that said second portion of said third composite beam is transmitted through a varying thickness of said circular wedge prism.

6. The system of claim 2 wherein said optical interferometer includes:

a second optical coupler having a first port optically coupled to said second port of said first optical coupler, and second and third ports;

a first optical fiber having a first end optically coupled to said second port of said second optical coupler, and a second end;

a third optical coupler having a first port optically coupled to said second end of said first optical fiber, and second and third ports; and wherein said path length modulating means includes:

a piezoelectric cylinder; and a second optical fiber looped around said piezoelectric cylinder such that energizing said piezoelectric cylinder elastically elongates said second optical fiber, said second optical fiber having a first end coupled to said third port of said second optical coupler and a second end coupled to the second port of said third optical coupler.

7. The system of claim 1 further including means for displaying the electrical signals generated by said optical detector.

8. A system for determining the index of refraction of an optically transmissive medium, comprising:

an optical energy source for generating an optical source beam;

a first optical coupler having first, second, third and fourth ports, the first port of said first optical coupler being coupled to receive said source beam;

the third port of said first optical coupler being coupled to direct a first portion of said source beam to irradiate an optically transmissive test sample having a known thickness between a front surface and a back surface such that said first portion of said source beam is divided into a first reflected beam that reflects off the front surface of said test sample, and into a second reflected beam that reflects off the back surface of said test sample, said test sample having an unknown index of refraction;

a first collimating lens being optically coupled to said third port of said first optical coupler, said first collimating lens comprising means for receiving and combining said first and second reflected beams into a first composite beam and directing said first composite beam into said third port;

the fourth port of said first optical coupler being coupled to direct a second portion of said source beam to irradiate an optically transmissive reference sample having a known thickness between a front surface and a back surface such that said second portion of said source beam is divided into a third reflected beam that reflects off the front surface of said reference sample and into a fourth reflected beam that reflects off the back surface of said reference sample, said reference sample having a known index of refraction;

a second collimating lens being optically coupled to said fourth port of said first optical coupler, said second collimating lens comprising means for receiving and combining said third and fourth reflected beams into a second composite beam and directing said second composite beam into said fourth port; and the first optical coupler including means for combining said first and second composite beams into a third composite beam and providing said third composite beam at said second port;

an optical interferometer having a fixed optical path length coupled to receive a first portion of said third composite beam from said first means and a variable optical path length coupled to receive a second portion of said third composite beam from said first means;

an optical path length modulating means coupled to said variable optical path length of said interferometer for changing the length of said variable optical path length to cause optical interference between said first and second portions of said third composite beam; and an optical detector coupled to receive said first and second portions of said third composite beam from said optical interferometer for generating electrical signals representative of said third composite beam, said electrical signals providing an indication of the index of refraction of said test sample.

9. The system of claim 8 wherein said optical interferometer includes:
  a second optical coupler having a first port optically coupled to said second port of said first optical coupler, and second and third ports;
  a first optical fiber having a first end optically coupled to said second port of said second optical coupler, and a second end;
  a third optical coupler having a first port optically coupled to said second end of said first optical fiber, and second and third ports;
  a third collimating lens optically coupled to said third port of said second optical coupler; and
  a fourth collimating lens optically coupled to said second port of said third optical coupler and optically aligned with said third collimating lens.

10. The system of claim 9 wherein said path length modulating means includes:
  a wedge prism interposed between said third and fourth collimating lenses and having non-parallel surfaces through which said second portion of said third composite beam emitted by said third collimating lens is transmitted, said wedge prism translating in a direction perpendicular to the optical axis of said third collimating lens.

11. The system of claim 10 wherein said path length modulating means includes:
  an optically transparent, circular wedge prism spinning between said third and fourth collimating lenses such that said second portion of said third composite beam is transmitted through a varying thickness of said circular wedge prism.

12. The system of claim 8 wherein said optical interferometer includes:
  a second optical coupler having a first port optically coupled to said second port of said first optical coupler, and second and third ports;
  a first optical fiber having a first end optically coupled to said second port of said second optical coupler, and a second end;
  a third optical coupler having a first port optically coupled to said second end of said first optical fiber, and second and third ports; and wherein
  said path length modulating means includes:
  a piezoelectric cylinder; and
  a second optical fiber looped around said piezoelectric cylinder such that energizing said piezoelectric cylinder elastically elongates said second optical fiber, said second optical fiber having a first end coupled to said third port of said second optical coupler and a second end coupled to the second port of said third optical coupler.

13. The system of claim 8 further including means for displaying the electrical signals generated by said optical detector.

* * * * *